US007499807B1

(12) United States Patent
Tolmachev et al.

(10) Patent No.: US 7,499,807 B1
(45) Date of Patent: Mar. 3, 2009

(54) METHODS FOR RECALIBRATION OF MASS SPECTROMETRY DATA

(75) Inventors: Aleksey V. Tolmachev, Richland, WA (US); Richard D. Smith, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 5 days.

(21) Appl. No.: 11/524,028

(22) Filed: Sep. 19, 2006

(51) Int. Cl.
*G06F 3/00* (2006.01)

(52) U.S. Cl. .......................... 702/23; 702/22; 702/182; 702/183

(58) Field of Classification Search .................. 702/19, 702/23, 27, 85, 86, 179, 182, 183, 22, 180; 250/252.1, 282; 436/58; 717/155; 435/58
See application file for complete search history.

(56) References Cited

U.S. PATENT DOCUMENTS 6,253,162 B1 6/2001 Jarmin et al.
6,608,302 B2 * 8/2003 Smith et al. .............. 250/252.1
6,983,213 B2 * 1/2006 Wang .......................... 702/85
7,202,473 B2 * 4/2007 Bateman et al. ............. 250/288
2005/0092910 A1 * 5/2005 Geromanos et al. ......... 250/282
2006/0288339 A1 * 12/2006 Wang ......................... 717/155

OTHER PUBLICATIONS

Tolmachev, et al., Critical Role of Mass Accuracy, 54th ASMS Conference, Seattle, May 28, 2006-Jun. 1, 2006.
Yanofsky, et al., Anal. Chem, 2005, vol. 77, pp. 7246-7254.
Tolmachev, (Poster) On CD Diskette, ASMS Conf., May 28, 2006-Jun. 1, 2006.
Grothe, et al., (Poster, #521), Progress Towards the Quantum Identification Limit in FTMS, On CD Diskette, ASMS Conf. May 28, 2006-Jun. 1, 2006.

* cited by examiner

*Primary Examiner*—Eliseo Ramos Feliciano
*Assistant Examiner*—Felix E Suarez
(74) *Attorney, Agent, or Firm*—James D. Matheson

(57) ABSTRACT

Disclosed are methods for recalibrating mass spectrometry data that provide improvement in both mass accuracy and precision by adjusting for experimental variance in parameters that have a substantial impact on mass measurement accuracy. Optimal coefficients are determined using correlated pairs of mass values compiled by matching sets of measured and putative mass values that minimize overall effective mass error and mass error spread. Coefficients are subsequently used to correct mass values for peaks detected in the measured dataset, providing recalibration thereof. Sub-ppm mass measurement accuracy has been demonstrated on a complex fungal proteome after recalibration, providing improved confidence for peptide identifications.

35 Claims, 13 Drawing Sheets

SEQUENCE LISTING

```
<160> NUMBER OF SEQ ID NOS: 13

<210> SEQ ID NO 1
<211> LENGTH: 13
<212> TYPE: PRT
<213> ORGANISM: Neurospora crassa

<400> SEQUENCE: 1

Asp Phe Tyr His Leu Ala Ala Gly Thr Ile Glu Val Lys
1               5                   10


<210> SEQ ID NO 2
<211> LENGTH: 15
<212> TYPE: PRT
<213> ORGANISM: Neurospora crassa

<400> SEQUENCE: 2

Ser Ser Ile Ile Ser Asn Leu Thr Ser Glu Ser Val Val Ala Gly
1               5                   10                  15


<210> SEQ ID NO 3
<211> LENGTH: 14
<212> TYPE: PRT
<213> ORGANISM: Neurospora crassa

<400> SEQUENCE: 3

Ser Asn Ala Glu Ala Asn Val Val Pro Leu Leu Glu Gly Arg
1               5                   10


<210> SEQ ID NO 4
<211> LENGTH: 15
<212> TYPE: PRT
```

```
<213> ORGANISM: Neurospora crassa

<400> SEQUENCE: 4

Glu Gly Val Thr Leu Gly Val Gly Ala Ser Phe Asp Thr Gln Lys
1               5                   10                  15


<210> SEQ ID NO 5
<211> LENGTH: 14
<212> TYPE: PRT
<213> ORGANISM: Neurospora crassa

<400> SEQUENCE: 5

Pro Met Met Val Ser Met Thr Ile Thr Gly Ile Thr Ala Arg
1               5                   10


<210> SEQ ID NO 6
<211> LENGTH: 14
<212> TYPE: PRT
<213> ORGANISM: Neurospora crassa

<400> SEQUENCE: 6

Tyr Ser Ser Glu Ile Ala Gln Ala Met Val Glu Val Ser Lys
1               5                   10


<210> SEQ ID NO 7
<211> LENGTH: 14
<212> TYPE: PRT
<213> ORGANISM: Neurospora crassa

<400> SEQUENCE: 7

Ser Ile Glu Leu Asp Pro Ala Met Thr Gln Ser Tyr Ile Lys
1               5                   10


<210> SEQ ID NO 8
<211> LENGTH: 24
<212> TYPE: PRT
<213> ORGANISM: Neurospora crassa

<400> SEQUENCE: 8

Ala Ala Leu Tyr Gly Thr Asn Gln Ile Phe Ala Gln Gly Asn Leu Asp
1               5                   10                  15

Asn Glu Gly Ala Leu Ser Thr Arg
            20


<210> SEQ ID NO 9
<211> LENGTH: 18
<212> TYPE: PRT
<213> ORGANISM: Neurospora crassa

<400> SEQUENCE: 9

Asn Ile Phe Gly Gly Ala Glu Thr Leu Ser Val Asn Ala Ala Ala Gly
1               5                   10                  15

Thr Arg


<210> SEQ ID NO 10
<211> LENGTH: 25
<212> TYPE: PRT
<213> ORGANISM: Neurospora crassa

<400> SEQUENCE: 10

Ser Ile Gly Gly Gly Gln Asp Met Ala Gln Phe Glu His Glu His Leu
1               5                   10                  15

Gly Asp Asp Phe Ser Ala Ser Leu Lys
```

-continued

```
        20                  25


<210> SEQ ID NO 11
<211> LENGTH: 18
<212> TYPE: PRT
<213> ORGANISM: Neurospora crassa

<400> SEQUENCE: 11

Lys Lys Asn Ala Asn Asn Asn Asn Asn Gly Gly Gly Ile Gly Gly His
1               5                   10                  15

Asn Asp


<210> SEQ ID NO 12
<211> LENGTH: 16
<212> TYPE: PRT
<213> ORGANISM: Neurospora crassa

<400> SEQUENCE: 12

Glu Glu Leu Gln Ala Ala Glu Ala Glu Ala Thr Phe Thr Ile Gln Arg
1               5                   10                  15


<210> SEQ ID NO 13
<211> LENGTH: 20
<212> TYPE: PRT
<213> ORGANISM: Neurospora crassa

<400> SEQUENCE: 13

Asp Ala Phe Ala Val Val Asn Gly Gly Val Pro Glu Thr Asn Ala Leu
1               5                   10                  15

Met Glu Glu Lys
            20
```

METHODS FOR RECALIBRATION OF MASS SPECTROMETRY DATA

STATEMENT REGARDING FEDERALLY SPONSORED RESEARCH OR DEVELOPMENT

The invention was made with Government support under Contract DE-AC05-76RL01830 awarded by the U.S. Department of Energy. The Government has certain rights in the invention.

CROSS-REFERENCE TO RELATED APPLICATIONS

The present application claims the benefit of U.S. Provisional Patent Application No. 60/792,557 filed Apr. 14, 2006, incorporated herein by reference in its entirety.

FIELD OF THE INVENTION

The present invention relates generally to methods for recalibration of mass spectrometry data that maximize mass accuracy and precision of measurement data. The invention finds application with, e.g., mass spectrometry instruments including those coupled to on-line separations instruments for characterization of complex mixtures.

BACKGROUND OF THE INVENTION

Mass spectrometry (MS) combined with on-line separations is a powerful tool for characterization of complex mixtures such as protein digests in proteomics studies. Separations instruments and methods include, but are not limited to, e.g., liquid chromatography (LC), gas chromatography (GC), capillary isoelectric focusing (CIEF), capillary zone electrophoresis (CZE), Capillary IsoTachoPhoresis (CITP), and ion mobility (e.g., IMS, FAIMS, or the like). FIG. 1 illustrates a contemporary process 100 for generating a mass accuracy histogram as will be known to those of skill in the mass spectrometry art. Spectra from, e.g., separation-FTICR MS measurements are compiled 105. Calibration coefficient values ($A_0$, $B_0$) obtained from an initial MS instrument calibration 110 are applied to spectra peak frequencies ($f_1, f_2, \ldots, f_{Nm}$) obtained in the course of LC-MS measurements 115. Next, m/z values are calculated from the peak frequencies using FTICR MS instrument calibration function, e.g., $m/z=A_0/(f+B_0)$ 120, from which a set of all observed m/z values ($m/z_1, m/z_2, \ldots, m/z_{Nm}$) is compiled 125. Next, deisotoping provides a monoisotopic list of observed molecular masses ($m_1, m_2, \ldots, m_{Nm}$) 130. A set of putative compounds ($comp_1, comp_2, \ldots, comp_{Np}$) likely to exist in a sample is also compiled 135, from which a list of theoretical masses ($m^T_1, m^T_2, \ldots, m^T_{Np}$) is calculated for each compound 140. A mass accuracy histogram is then generated by plotting the number of matches between the set of putative masses and the set of observed molecular masses as a function of the mass residual bin, i.e. the histogram of values ($dm_1, dm_2, \ldots, dm_M$), taken either in absolute units of the mass difference, or in the relative units of parts per million (ppm) 150. The mass accuracy histogram provides a measure of mass accuracy and mass precision that can be defined by the position of the histogram peak maximum and the peak width. Accurate mass measurements of complex mixtures can be compromised due to variability associated with mass spectra acquisition conditions over the course of an on-line separation, which is reflected in the mass accuracy histogram peak offset from 0 and having an increased width. Confident identification of thousands of compounds becomes feasible only if one obtains sufficiently high mass measurement accuracy. Accurate mass measurements require mass spectra acquisition conditions that include total ion current (TIC) or trapped ion population, and the distribution of ion abundances throughout the m/z range. Wide variations in these factors often occur, often beyond conditions providing the most accurate mass measurements. Accordingly, there remains a need for methods providing recalibration of mass measurement data from MS analyses that maximize mass accuracy and minimize mass errors permitting characterization of complex analyte mixtures.

SUMMARY OF THE INVENTION

Methods are disclosed for recalibration of mass spectrometry data that involve use of masses from a known list of putative compounds for a mixture being analyzed as would be encountered, e.g., in high throughput proteome analyses of a defined biological system (e.g., a specific microbe, human blood plasma, etc.). The methods take into account variable mass measurement conditions, correcting the mass calibrations (i.e. calibration parameters or variables of a calibration function) according to a specific range of parameters or multiple regions of parameters critical to accurate mass measurements. Parameters include, but are not limited to, e.g., total ion count (TIC), individual peak abundance, ion intensity, m/z value, molecular mass, spectrum acquisition time, and/or separation time. In various embodiments, recalibration of the invention involves an automated analysis of a mass accuracy histogram, making a confident distinction possible between true and false identifications. Mass accuracy improvement has been demonstrated, for example, on Liquid Chromatography-Mass Spectrometry (LC-MS) data acquired using both custom and commercial Fourier Transform Ion Cyclotron Resonance (FTICR) Mass Spectrometry (FTICR-MS) systems, Hybrid LTQ FT, Hybrid LTQ Orbitrap systems, as well as Time of Flight Mass Spectrometry (TOF-MS) and is expected to be applicable to all separation-MS systems. Recalibration of the instant invention effectively compensates for systematic mass measurement errors and additionally reduces the mass error spread, yielding improvements in both accuracy and precision of mass measurements. Mass measurement improvement is virtually independent of initial instrument calibration coefficient values. Thus, need for routine instrument calibration is reduced. For example, recalibration has been demonstrated for a complex bacterial proteome, yielding sub-part-per-million (sub-ppm) mass measurement accuracy thereby providing greatly improved confidence for identifications.

In one aspect of the invention, a method of general recalibration is disclosed for improving mass measurement accuracy in a combined separation—mass spectrometric (MS) measurement, comprising: providing mass spectra from a dataset measured from a combined separation—MS measurement, wherein the measured dataset is obtained using an instrument-specific calibration function; comparing a set of masses ($m_1, m_2, \ldots m_{Nm}$) compiled from mass, or m/z, values determined from a measured set of data [e.g., from peak frequencies ($f_1, f_2, \ldots, f_{Nm}$)] to a set of masses ($m^T_1, m^T_2, \ldots m^T_{Np}$) identified from a putative list of compounds ($comp_1, comp_2, \ldots, comp_{Np}$) defining a putative dataset, said comparison yielding a subset(s) comprised of statistically matching and/or correlated pairs of mass, or m/z, values from said measured and putative datasets. Here (Nm) is the number of monoisotopic peaks observed in the dataset and (Np) is the number of putative compounds; determining a set of calibration coefficient values ($A_{s1}, \ldots, A_{sN}$) that minimizes the mass error spread ($dM_w$) and the overall effective mass error ($dM_s$) between the correlated pairs of mass, or m/z, values. Here N is the number of calibration coefficients employed in the instrument-specific calibration function; and calculating m/z values for detected peaks in the measured dataset using the set of optimal coefficient values ($A_{s1}, \ldots, A_{sN}$), providing for recalibration of the dataset from the combined separation—MS measurement, including, e.g., detected peaks and/or the measured m/z values therein, substantially improving mass accuracy and precision thereof.

In one embodiment, the instrument-specific calibration function is of the form [$(m/z)=F_i(phq_1, phq_2, \ldots phq_M, A_1, A_2, \ldots A_N)$], where $F_i$ is any instrument-specific calibration function, ($phq_1, phq_2, \ldots phq_M$) are any of from 1 to M physical parameters measured in a separation-MS measurement and used as defining parameters in said instrument-specific calibration function, and ($A_1, \ldots, A_N$) are any of from 1 to N instrument-specific calibration coefficients used as defining coefficients in said instrument-specific calibration function.

In another embodiment, physical parameters include, but are not limited to, e.g., frequency, peak cyclotron frequency, total ion current, ion flight time, ion abundance, ion count, m/z values, or the like, and combinations thereof.

In another embodiment, the instrument-specific calibration function is from an instrument selected from Fourier Transform instruments, time-of-flight instruments, ion cyclotron resonance instruments, orbitrap instruments, and combinations thereof.

In another embodiment, correlated pairs between measured and putative mass or m/z values are determined using a relaxed tolerance value ($T_{search}$). The tolerance value is selected larger than the expected mass accuracy of measurements before correction thereby achieving inclusion of pertinent mass error data.

In another embodiment, mass difference between the correlated pair is sufficiently small such that the absolute value thereof is less than the selected tolerance value, and the tolerance value is larger than any potential inaccuracy derived from the mass spectrometry measurement or instrument, such that a major fraction of all potentially useful matches passes a tolerance threshold. In one example, the major fraction is a fraction greater than or equal to about 99%, but is not limited thereto.

In another embodiment, overall effective mass error ($dM_s$) and mass error spread ($dM_w$) are determined using a mass accuracy histogram. The mass accuracy histogram can take the form of a table of numbers of matches corresponding to a bin of the mass, or m/z, differences between the measured and putative values for each match. The overall effective mass error ($dM_s$) is determined as a position of a centroid or maximum of a histogram peak, said mass error being representative of systematic, non-random error for matches between said measured and said putative values, wherein the mass differences are expressed either in absolute or in relative units.

In another embodiment, effective deviation between experimental (measured) and putative (theoretical or exact) m/z values is taken as the characteristic width ($dM_w$) of a histogram peak, wherein the histogram peak is representative of systematic (non-random) matches between the experimental and the putative m/z values.

In another embodiment, effective deviation is iteratively incremented and the occurrence count or frequency of matches is calculated as a total number of pairs falling within a particular bin of mass deviation.

In another embodiment, a set of mass residuals ($dm_1, dm_2, \ldots, dm_M$) is calculated for the correlated pairs of mass, or m/z, values selected from the measured and putative datasets.

In another embodiment, a distribution of mass residuals ($dm_1, dm_2, \ldots, dm_M$) is generated as a function of mass difference within the selected tolerance value or range, wherein the tolerance value defines the mass accuracy for generating a mass accuracy distribution of the mass residuals.

In another embodiment, the determining of the set of calibration coefficient values ($A_{s1}, \ldots, A_{sN}$) comprises incrementing initial calibration coefficients ($A_1, \ldots, A_N$) corresponding to a instrument-specific calibration function using an incrementing factor, achieving larger or smaller mass errors ($dM_w$) and ($dM_s$), whereby a set of modified values ($A_{s1}, \ldots, A_{sN}$) is selected that delivers ($dM_s=0$) and that minimizes the mass error spread ($dM_w$), thereby maximizing peak maxima in a mass accuracy histogram.

In another embodiment, the incrementing factor is a value in the range from about 1 ppm to about 10 ppm, or alternatively in the range from about 1 ppm to about 5 ppm, or alternatively in the range from about 1 ppm to about 2 ppm.

In another embodiment, the incrementing is iteratively repeated using a second (third, . . . ) incrementing factor smaller than an incrementing factor preceeding the second (third, . . . ) incrementing factor. The second (third, . . . ) incrementing factor have values smaller than the increment used at the preceeding iteration, thereby obtaining progressively more accurate values of said calibration coefficient values ($A_{s1}, \ldots, A_{sN}$), that ultimately delivers ($dM_s=0$) and that minimizes the mass error spread ($dM_w$).

In another embodiment, iterative incrementing of an initial set of coefficient values for determining a set of calibration coefficient values ($A_{s1}, \ldots, A_{sN}$) comprises iteratively calculating a mass accuracy histogram using the calibration coefficient values optimized at a particular iteration.

In another embodiment, all measured mass, or m/z, values calculated from a separation-MS measurement are recalibrated, or the recalibration is applied to the same.

In another embodiment, all peak frequencies detected and/or measured in a separation-MS measurement are recalibrated, or the recalibration is applied to the same.

In another embodiment, all correlated pairs of mass, or m/z, values compiled from measured and putative datasets are recalibrated, or the recalibration is applied to the same.

In another aspect of the invention, a method of multiregional recalibration is disclosed for improving mass measurement accuracy in a combined separation—mass spectrometric (MS) measurement, comprising: providing mass spectra from a dataset measured and obtained in a separation—MS measurement using an instrument-specific calibration function; retaining values of a first physical property [e.g., frequency (f)] used as a parameter in the calibration function for calculation of mass, or m/z, values corresponding to mass, or m/z, peaks measured in said mass spectra; selecting a second physical property, a second calibration parameter, or a quantity derived therefrom that influences accurate mass calibration of peaks measured in said mass spectra; partitioning peaks measured in said mass spectra into from 1 to K regions or groups, each region or group having a selected interval or range of values corresponding to said second physical property, the second calibration parameter, or a quantity derived therefrom; comparing masses [$(m_1, \ldots m_{N1})$, $(m_1, \ldots m_{N2})$ $(m_1, \ldots m_{NK})$] in each of the groups or regions derived from the measured dataset to a set of masses ($m^T_1, m^T_2, \ldots m^T_{Np}$) identified from a putative list of compounds ($comp_1, comp_2, \ldots, comp_{Np}$) defining a putative dataset, where ($N_1$, $N_2, \ldots, N_K$) are the number of monoisotopic peaks in each of said 1 to K regions or groups and (Np) is the number of putative compounds, wherein the comparing yields correlated pairs of mass values between said neutral masses and said putative masses corresponding to each of said 1 to K regions or groups; determining calibration coefficient values $(A_{s1}, \ldots, A_{sN})_1, (A_{s1}, \ldots, A_{sN})_2, \ldots, (A_{s1}, A_{sN})_K$ for each of said 1 to K regions or groups, wherein the coefficient values minimize mass error spread ($dM_w$) and overall mass error ($dM_s$) between said correlated pairs of mass values thereby maximizing mass accuracy and precision for data in each of said 1 to K regions or groups corresponding to said second physical property, said second calibration parameter, or said quantity derived therefrom, recalibrating said coefficients in each of said 1 to K regions or groups; calculating m/z values for detected peaks in each of said 1 to K regions or groups using the retained primary physical property values and the recalibrated coefficient values. The mass spectral (m/z) peaks and/or the measured m/z values in the dataset from the combined separation—MS measurement are recalibrated, maximizing the mass measurement accuracy and precision thereof.

In one embodiment, the retained primary physical property is peak cyclotron frequency.

In another embodiment, a second physical property is selected from total ion current, total ion count, total ion intensity, ion intensity, ion abundance, individual ion intensity, m/z, m/z range, time, elution time, or the like, and combinations thereof.

In another embodiment, a second calibration parameter is a separation parameter, including, but not limited to, e.g., separation time, spectrum acquisition time.

In another embodiment, a quantity derived from a second physical property or calibration parameter is selected from peak frequencies ($f_1$, $f_2$, $f_{Nm}$); m/z values ($m/z_1$, $m/z_2$, . . . , $m/z_{Nm}$), ion times of flight, ion characteristic frequencies, monoisotopic neutral masses ($m_1$, $m_2$, . . . $m_{Nm}$), and combinations thereof.

In another embodiment, the instrument-specific calibration function is of the general form $(m/z)=F_i(phq_1, phq_2, \ldots phq_M, A_1, A_2, \ldots A_N)$, where $F_i$ represents any function selected for mass spectrometry calibration, $(phq_1, phq_2, \ldots phq_M)$ represent any of from 1 to M measured physical parameters, and ($A_1$, $A_N$) represent any of from 1 to N selected instrument-specific calibration coefficients.

In another embodiment, masses are mono-isotopic neutral masses.

In another embodiment, the number of regions or groups is selectable.

In another embodiment, the regions or groups comprise a substantially equal quantity, proportion, or population of a measured physical property or parameter.

In another embodiment, the regions or groups are selected to be of a variable size.

In another embodiment, calibration coefficient values are optimized for a region of a parameter that influences the calibration. In one example, measured m/z values are divided into groups according to a specific range of the calibration parameter chosen.

In another aspect of the invention, a method for multi-dimensional recalibration is disclosed for improving mass measurement accuracy in a combined separation—mass spectrometric (MS) measurement, comprising: providing mass spectra from said separation—MS measurement encompassing a dataset obtained using an instrument-specific calibration function, said dataset comprising mass spectral (m/z) peaks measured in said mass spectra; retaining values of a primary physical property [e.g., frequency values (f)] used in said calibration function for calculation of m/z values, said values being retained for mass spectral (m/z) peaks measured in said mass spectra; selecting a set of (M) secondary physical properties, calibration parameters, or quantities derived therefrom related to any mass spectral (m/z) peaks measured in said mass spectra that influence accurate mass calibration; partitioning data corresponding to said set of (M) secondary physical properties, calibration parameters, or quantities derived therefrom into ($K_j$) regions or groups where (j=1, . . . , M) denotes a physical property index correlated with each of said (M) secondary physical properties, calibration parameters, or quantities derived therefrom, said regions or groups defining a multidimensional (M-dimensional) recalibration space, each region or group in said space comprising a selected range or population of data correlated with said measured physical property, parameter, or quantity; comparing neutral masses $[(m_1, \ldots m_{N(1,1,\ldots)}), \ldots (m_1, \ldots m_{N(i1,\ldots,iM)}), \ldots]$ derived from data in each of said ($K_j$) regions or groups to masses $(m^T_1, m^T_2, \ldots m^T_{Np})$ identified and extracted from a putative list of compounds ($comp_1$, $comp_2$, $comp_{Np}$), where $(N(i_1, \ldots, i_M))$ is the number of peaks (e.g., monoisotopic peaks) observed in each M-dimensional region or group corresponding to a set of (M) indexes $(i_1, \ldots, i_M)$. Here (Np) is the number of putative compounds. The comparing yields statistically matching and/or correlated pairs of mass values corresponding to each of the M-dimensional regions or groups correlated with the (M) measured physical properties, calibration parameters, or quantities derived therefrom; determining a set(s) of optimized calibration coefficient values $(A_{s1}, A_{sN})_{i1,\ldots,iM}$ for each of said M-dimensional regions or groups corresponding to said secondary physical properties, calibration parameters, or quantities derived therefrom that minimizes mass error spread ($dM_w$) and mass error ($dM_s$) between said correlated pairs of mass values, said coefficient values corresponding to each of said M-dimensional regions or groups thereby optimizing each correlated range or population of data in said dataset providing a multi-dimensional recalibration of data in said dataset; calculating recalibrated m/z values for each mass spectral (m/z) peak in said dataset using the retained primary physical property values (f) and said optimized coefficient values for said M-dimensional regions or groups to which said mass spectral (m/z) peak belongs; and whereby said mass spectral (m/z) peaks and/or said measured m/z values in said dataset from said combined separation—MS measurement are recalibrated improving mass measurement accuracy thereof.

In one embodiment, partitioning of data is effected in conjunction with an M-dimensional data array having dimensions defined by two or more measured physical properties, calibration parameters, or measured quantities derived therefrom, each respective data location in said array corresponding with a specific region or group in said 1 to $K_i$ regions or groups for each i-th of said two or more measured physical properties, calibration parameters, or quantity derived therefrom into any of from 1 to $K_i$ regions or groups correlated therewith.

In another embodiment, masses are selected as monoisotopic neutral masses.

In another embodiment, the measured physical property is peak cyclotron frequency.

In another embodiment, a mass accuracy histogram is used to find the optimal calibration coefficients for each of the multi-dimensional regions or groups.

In another embodiment, use of a mass accuracy histogram comprises use of areas having a suitable bin size.

In another embodiment, the bin size is selected in the range from about 0.2 ppm to about 0.5 ppm.

In another embodiment, the bin size is of a magnitude smaller than the ($dM_w$) value thereby providing a suitable true attribution area.

In another embodiment, a tolerance value is used for the histogram larger than the expected mass accuracy thereby maximizing inclusion of true attributions.

In another embodiment, a tolerance value ($T_{ppm}$) of about +30 ppm is selected.

In yet another embodiment, a tolerance value ($T_{ppm}$) of about ±50 ppm is selected.

In still yet another embodiment, a tolerance value ($T_{ppm}$) of about ±100 ppm is selected.

In another embodiment, optimizing of the calibration coefficients for recalibration involves use of initial calibration values obtained from an external calibration of an MS instrument.

In another embodiment, optimizing of said calibration coefficients for recalibration does not involve use of initial calibration values obtained from an external calibration of an MS instrument.

In another embodiment, optimizing of said calibration coefficients for recalibration involves iteratively incrementing of initial calibration coefficients until mass errors are minimized, generating optimal coefficients, providing for recalibration of the separations-MS data.

In another embodiment, optimizing of said calibration coefficients involves simultaneous adjustment of all of said coefficients.

In another embodiment, an instrument-specific calibration function is replaced with a mass-correction function of the following form: $(m/z_c)=F_c(m/z, C_1, \ldots, C_N)$, where $(m/z_c)$ is a corrected m/z value calculated using a correction function ($F_c$) calculated using an un-corrected m/z value and a set of (N) correction coefficients ($C_1, \ldots, C_N$).

In another embodiment, a mass correction function ($F_c$) is used to obtain corrected ($m/z_c$) values in conjunction with correction coefficients ($C_1, \ldots, C_N$) optimized specifically for each of a plurality of multi-dimensional regions of calibration parameters.

In another embodiment, calibration parameters are selected from total ion intensity, individual ion intensity, separation time, other separation parameters, spectrum acquisition time, and m/z range.

In another embodiment, a mass accuracy histogram is used to determine said optimized correction coefficients ($C_1, \ldots, C_N$) for each of a plurality of multidimensional regions or groups.

In another aspect of the invention, a method of histogram maximization is disclosed for finding optimized calibration coefficients for recalibration of separations-MS data, comprising: generating one or more sets of N trial calibration coefficients; calculating and plotting a histogram comprised of a distribution of matches between measured and putative masses as a function of mass deviation for each of said one or more sets of (N) calibration coefficients; determining a central zero mass deviation histogram value for each of said one or more sets of (N) trial calibration coefficients, wherein values for calibration coefficients that produce a central histogram value maximum determines coefficient values optimized for recalibrating separations-MS data.

In one embodiment, calibration coefficients are generated in conjunction with an instrument-specific calibration function.

In another embodiment, instrument-specific calibration function is replaced with a mass-correction function.

In another aspect of the invention, a method is disclosed for optimizing calibration coefficients, providing for recalibration of separations-MS data, comprising: generating one or more sets of initial or trial calibration coefficients; calculating and plotting a histogram of matches between measured and putative masses for each of said one or more sets of calibration coefficients; determining mass error ($dM_s$) and mass error spread ($dM_w$) values from said histogram using an iterative incrementing of each of said one or more sets of calibration coefficients, wherein values for calibration coefficients that produce the smallest absolute value for said mass error ($dM_s$) value and for said mass error spread ($dM_w$) value determines optimized coefficient values for recalibrating said separations-MS data.

In one embodiment, calibration coefficients are generated in conjunction with an instrument-specific calibration function.

In another embodiment, instrument-specific calibration function is replaced with a mass-correction function.

DETAILED DESCRIPTION

Figure 1:
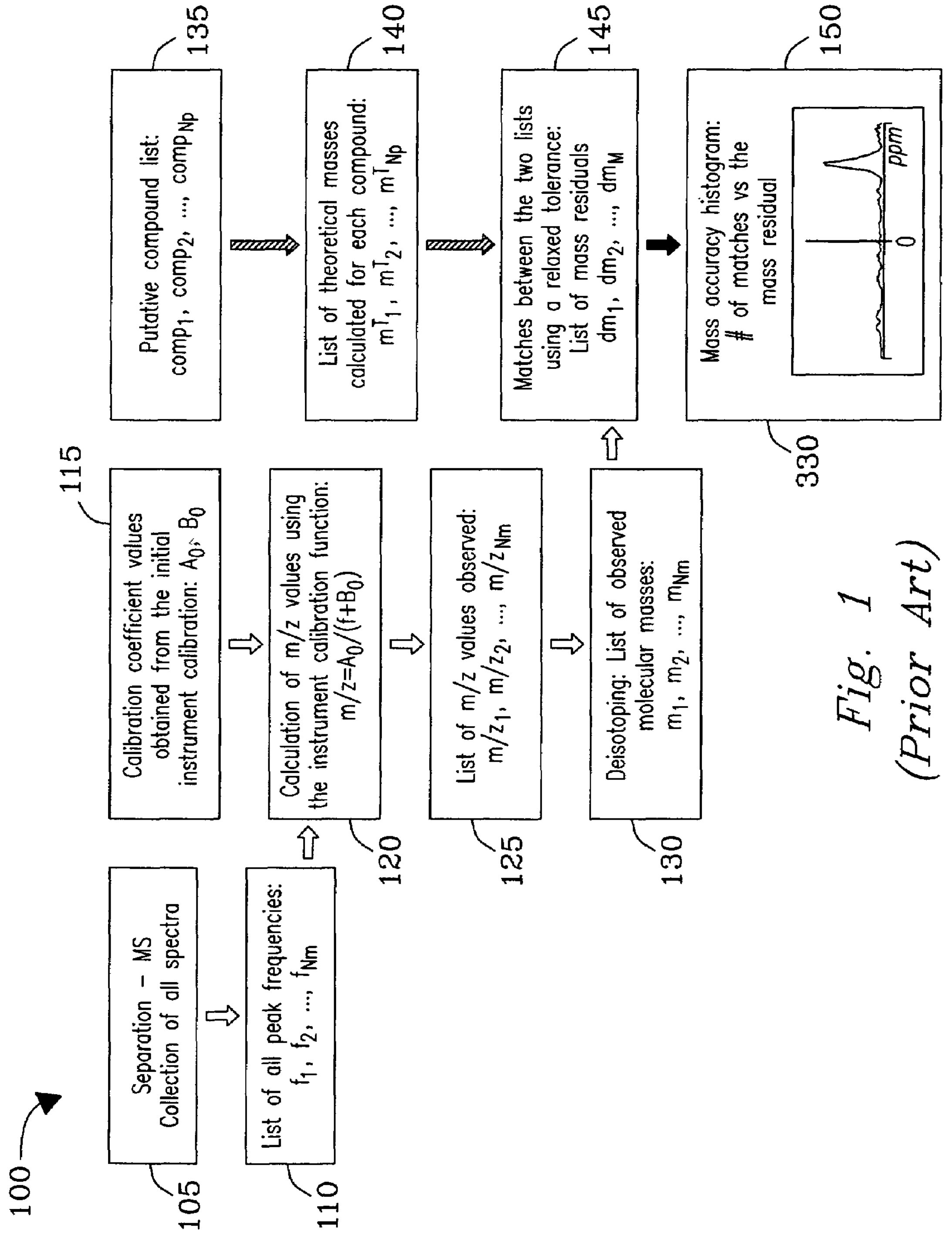
Fig. 1 (Prior Art)
FIG. 1 (Prior Art) presents a contemporary scheme for generating a mass accuracy histogram.

Disclosed herein are methods for recalibrating mass spectral data. Recalibration methods of the present invention use accurate mass information contained in a listing of putative compounds. The term "recalibration" as used herein refers to the process of finding optimal calibration coefficient values for a calibration function that maximize mass accuracy and precision of data from a given analytical mass spectrometry dataset or a combined mass spectrometry-separations dataset obtained, e.g., from a mixture being analyzed. The term "putative" refers to generally accepted "true" or "exact" (i.e., reference) masses for components and compounds expected from an analysis of a specified analyte or mixture. The term "exact" as used herein means the uncertainty for selected compounds in a putative listing is statistically insignificant. The methods disclosed herein have been tested on data collected from high throughput LC-FTICR and LC-TOF (MS) measurements of microbial proteome samples as well as standard peptide mixtures. Standard peptide mixtures for routine quality control (QC) analyses have been described, e.g., by Purvine et al. ("Standard Mixtures for Proteome Studies", *OMICS* 2004, 8, 79-92).

Recalibration methods described herein are robust in situations where a substantial probability of multiple false attributions occurs. The term "attributions" refers to matches obtained when measured or detected values are compared to putative values (e.g., for m/z) from a reference listing or database. The term "true attributions" means a correct (true) match exists between measured or detected m/z values and putative reference compounds. The term "false attributions" means a match is identified between measured or detected m/z values and putative reference compounds, but the match is incorrect. The term "random attributions" refers to the number or level of random matches that occur between measured or detected m/z values and putative reference compounds. And, as used herein, the term "random attribution level" corresponds to a baseline level of noise in a mass accuracy histogram generated from a given data set above which true attributions are located and below which false attributions are located.

Recalibration of the invention effectively compensates for systematic mass measurement errors ($dM_w$) and reduces mass error spread ($dM_s$), improving both the accuracy and precision of mass measurements. "Systematic Mass Measurement Errors" as used herein refer to errors that are statistically centered about a central peak maximum, where ($dM_s$) represents the peak offset or measurement deviation relative to a (0 ppm) position, a measure of the overall effective mass error, or mass measurement accuracy; ($dM_w$) represents the peak width or peak spread, a measure of mass measurement precision, or mass variation. Recalibration compensates for systematic mass measurement errors ($dM_w$) by yielding a peak offset positioned at zero (0) ppm. The improvement in mass measurement is virtually independent of initial instrument calibration, reducing the need for routine instrument calibration. Recalibration methods described herein can be applied in conjunction with any analytical separations-MS measurement instrument or process as will be implemented by those of skill in the art. The methods produce accurate results for complex datasets having large numbers of detected species, e.g. ~$10^5$ isotopic molecular masses or compounds, and are equally applicable to sets of matching pairs identified between experimental and theoretical mass values of similar size.

Figure 2:
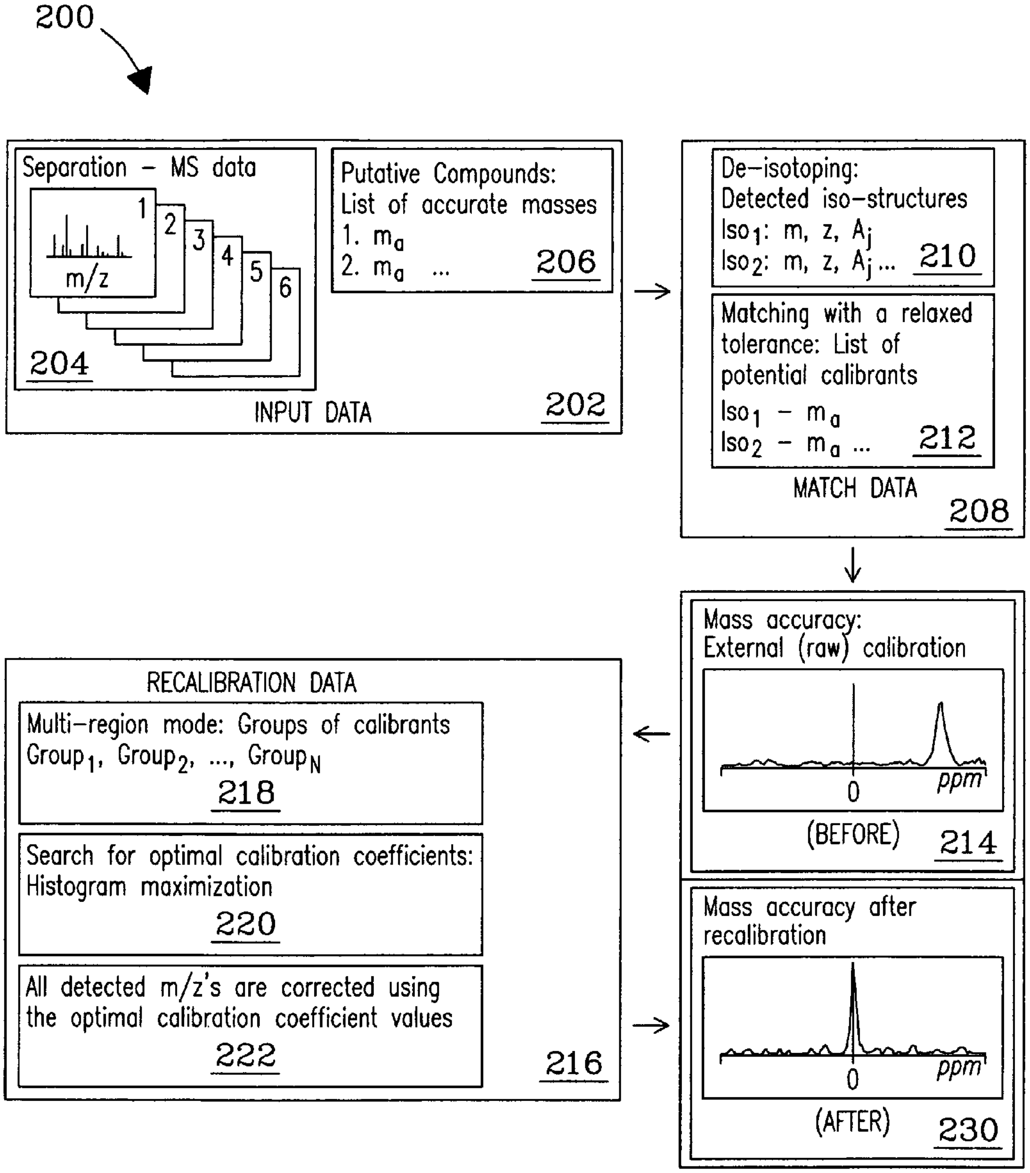
FIG. 2 is a flowchart illustrating a generalized method for recalibration of separations-MS data, according to an embodiment of the invention.

FIG. 2 is a flowchart illustrating the general process for recalibration of mass spectrometry (MS) data, according to an embodiment of the invention. First, data are compiled 202. Input data include, e.g., a collection of all mass spectra acquired in the course of a mass spectrometry experiment 204, e.g., an MS dataset obtained from a separation-MS measurement. Inputs further include data and/or information on putative compounds as might be identified from previous analyses of related samples, e.g., a database of putative compounds ($comp_1$, $comp_2$, . . . ) providing, e.g., a set of theoretical exact masses ($m_{a1}$, $m_{a2}$, . . . ) likely to exist in the sample under investigation 206. Next, data in the measured and putative datasets are matched and potential calibrants are identified 208. Here, preparation of the experimental (measured) MS dataset can include, but is not limited to, steps such as e.g., de-isotoping to obtain a set of unique molecular masses (m) for measured species (e.g., [iso_1 (m); iso_2: (m); . . . ]). The set of mass, or m/z, data can further include information on ion charge (z), ion abundance, ion intensity ($A_i$) and like physical properties, ultimately yielding a desired dataset of unique, molecular masses and supporting information, e.g., [iso_1: (m, z, $A_i$); iso_2: (m, z, $A_i$) . . . ] 210. Matching is determined using a relaxed tolerance value ($T_{search}$), which provides a set of potential calibrants [iso_1-ma; iso_2-ma; . . . ] and corresponding mass residuals ($dm_1$, $dm_2$, . . . ) 212. The relaxed tolerance value ($T_{search}$) may be stated in absolute or relative terms, e.g., in parts-per-million ($T_{ppm}$), in parts-per-billion ($T_{ppb}$), in percent [T(%)], and many like measures. No limitations are intended. Mass measurement accuracy of the raw dataset before recalibration is characterized, e.g., by means of a histogram of the distribution of mass residuals 214. Recalibration is then performed for all mass or m/z values in the measured MS dataset 216. Here, recalibration is illustrated as using a multi-regional algorithm or approach 218 (described further herein), but is not limited thereto. Recalibration further includes determining optimal calibration coefficients, e.g., in conjunction with histogram maximization 220, followed by recalibration (correcting) of data (e.g., mass and/or m/z values) in the measured MS dataset 222, as described further herein. Finally, mass accuracy for the recalibrated dataset is evaluated using a histogram of mass residuals 230. No limitations are intended. All steps as will be contemplated by those of skill in the art in view of the present disclosure fall within the scope of the invention. Recalibration methods for recalibration of MS measurement data will now be described, according to different embodiments of the invention. Recalibration methods of the invention include: (i) General Recalibration, (ii) Multi-regional Recalibration, (iii) Multi-dimensional Recalibration, and (iv) Mass (m/z) Correction/Recalibration, described further hereafter.

Figure 3:
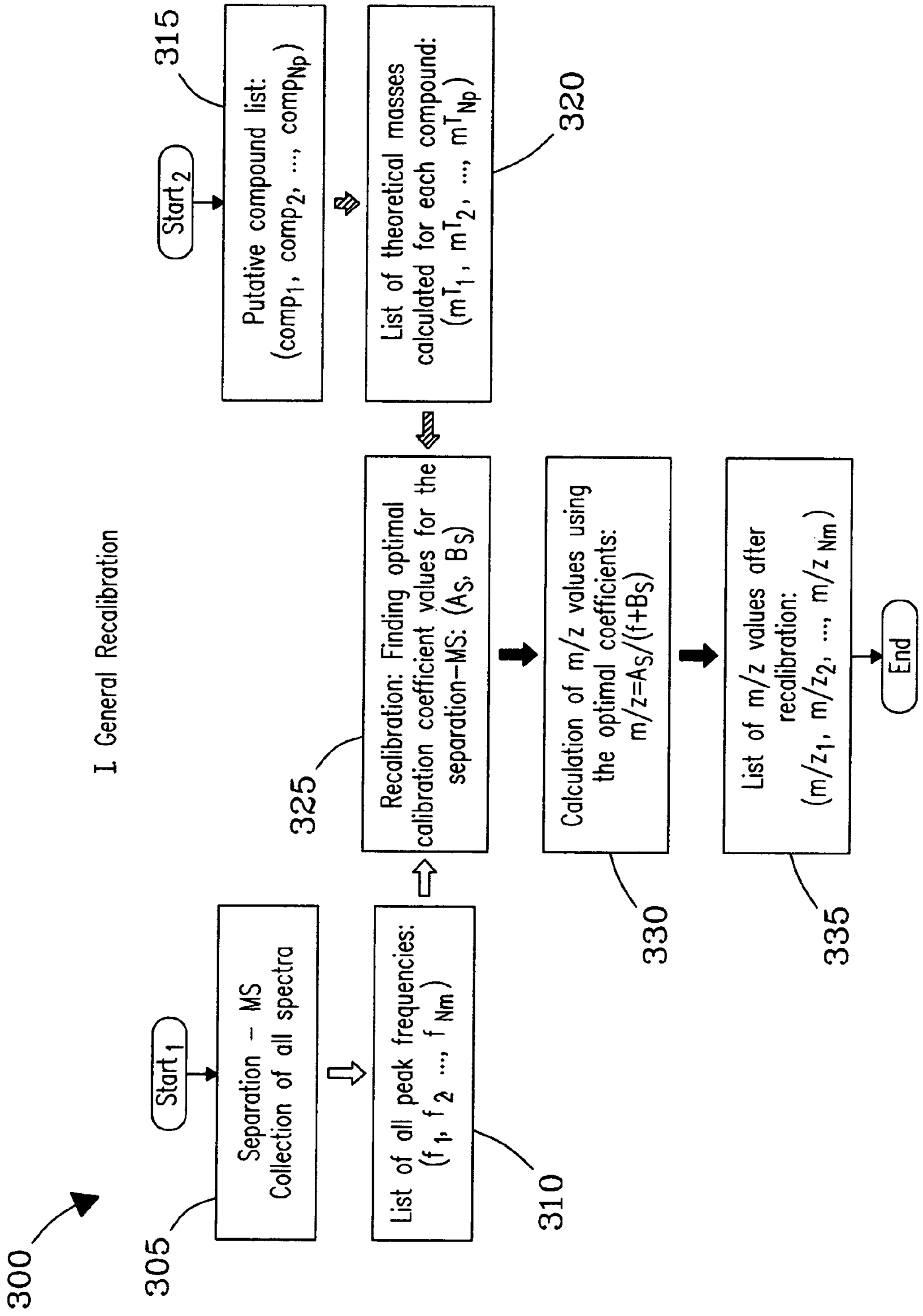
FIG. 3 illustrates a process for recalibration of data collected in a combined separation-MS measurement, according to an embodiment of the invention.

FIG. 3 illustrates a General Recalibration process 300 for recalibrating (correcting) MS data collected in an MS measurement, e.g., a combined separations-MS measurement or analysis, according to an embodiment of the invention. ($START_1$). In the general recalibration approach, mass spectra from a separation-MS analysis are collected 305. The MS dataset includes peaks detected and/or measured in conjunction with an instrument-specific calibration function, e.g., $m/z=A_0/(f+B_0)$, where $A_0$ and $B_0$ are instrument-specific calibration coefficients. Various physical parameters and/or properties can be determined from the dataset, including, but not limited to, e.g., peak frequencies (f) or other selected physical parameters or properties of interest. Data compiled are not intended to be limiting. For example, data can consist of all peak m/z values detected in each mass spectrum in a course of on online separation, e.g., an LC-MS analysis. In another instance, data may include, e.g., a collection of all acquired mass spectra. In the figure, peak frequencies ($f_1, f_2, \ldots, f_{Nm}$) observed in the spectra are compiled. 310. ($START_2$). Independently, or consecutively, a set of putative compounds ($comp_1, comp_2, \ldots, comp_{Np}$) is compiled 315, from which a list of theoretical masses are calculated for each compound in the putative list of compounds ($m^T_1, m^T_2, \ldots, m^T_{Np}$) 320. Recalibration involves determining optimal calibration coefficients ($A_s$, $B_s$) that maximize mass accuracy and precision in the MS measurement, e.g., the separation-MS, dataset 325. In one embodiment, optimal coefficients ($A_s$, $B_s$) are found by incrementing initial coefficient values ($A_0$, $B_0$) iteratively using small (e.g., part-per-million) variations applied thereto. By way of non-limiting example, ($A_0$, $B_0$) can be incremented by, e.g., 1-2 ppm achieving a better or worse mass histogram with a better or worse peak maximum. Once a peak maximum is identified, coefficient values ($A_0$, $B_0$) can be further incremented by, e.g., 0.1 ppm to identify a final set of optimized coefficient values ($A_s$, $B_s$). Preferred values correct the systematic mass error ($dM_s$) to "0" ppm and minimize the mass error spread ($dM_w$). Coefficients ($A_s$, $B_s$) then allow recalibrated (corrected) m/z values to be calculated in conjunction with the instrument-specific calibration function 330. And, a set of recalibrated m/z values ($m/z_1, m/z_2, \ldots, m/z_{Nm}$) is compiled 350. END.

Putative compounds likely to exist in a sample being analyzed may be identified, e.g., from previous analyses of related samples or from compiled databases containing data on potential or likely candidates in a sample or related sample. Putative compounds include, e.g., peptides that have been confidently identified in a related sample mixture, e.g. from the same organism or tissue type. The set of peptides further includes theoretical masses calculated for each of the possible peptides, including, e.g., "potential mass and time (PMT) tags" for the organism under investigation. PMT tag databases for various organisms are generated largely from multiple analyses of peptides from tryptic digests using LC-MS/MS or other peptide identification sources, e.g. SEQUEST analysis software [Novatia, LLC, Monmouth Junction, N.J., USA], as will be understood by those of skill in the art. PMT tags generally contain more detailed information than putative mass listings by which comparisons can be made, optionally including such information as elution times and other related biological information characteristic or descriptive of biological compounds and/or components. Depending on data or information available, either putative mass listings or PMT tags may be used. No limitations are intended. Alternatively, in silico or computer generated or theoretical lists of tryptic peptides can be used as the set of putative compounds. Along with accurate masses, other characteristics can be provided such as parameters characterizing separation properties, e.g. normalized elution time (NET) in the case of LC separations for each detected isotopic structure. This additional information can be used for generating a set of more confident identifications. Normalized elution time (NET) information from an LC separation, e.g., can be used to improve peptide identifications. Putative lists of accurate masses for organisms typically contain accurate masses of from $10^3$ to $>10^5$ different peptides, but is not limited. And, sets of PMT tags can contain accurate masses of from $10^4$ to $>10^5$ different peptides depending upon the organism or tissue under investigation, but again is not limited thereto.

Multi-Region Recalibration

Figure 4:
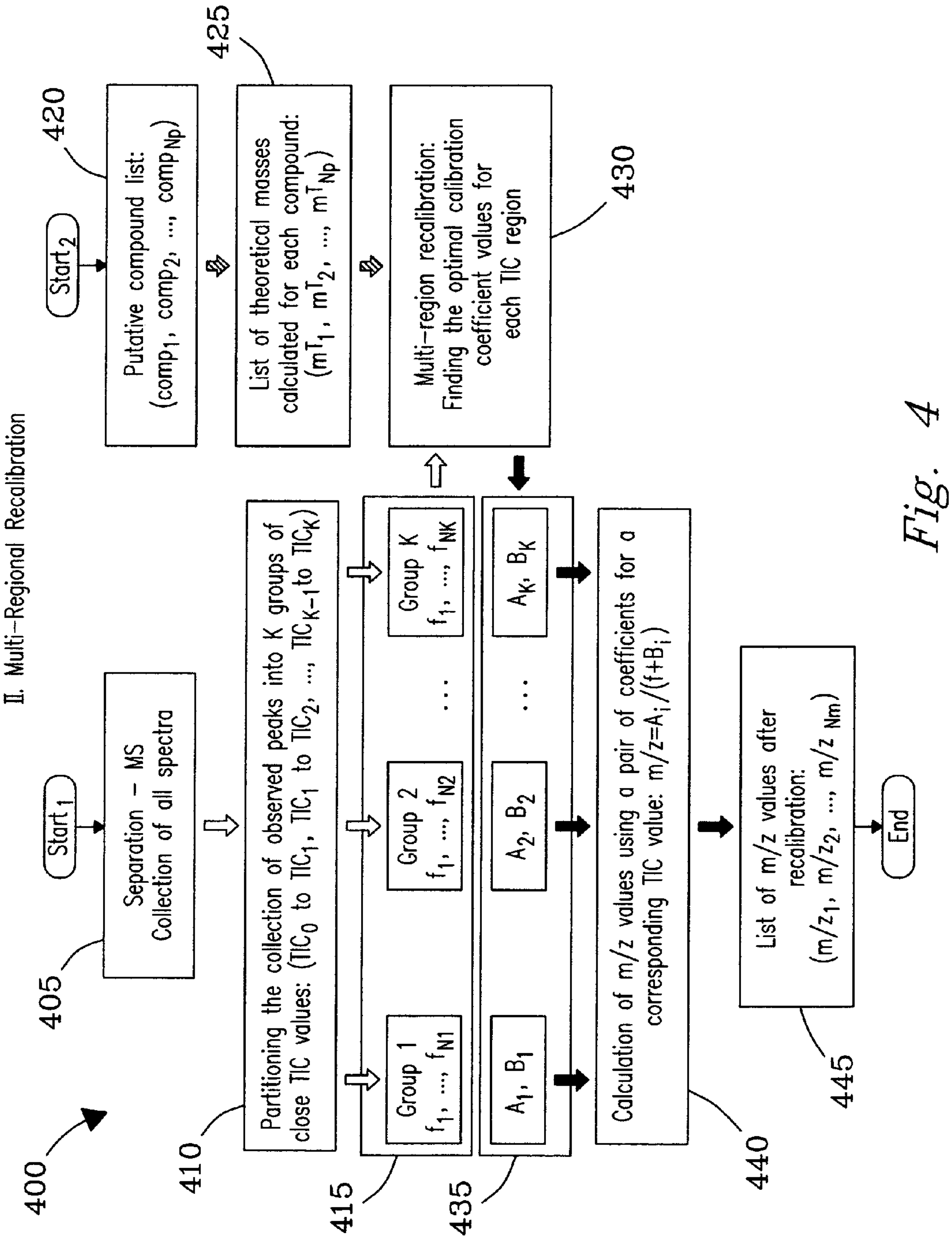
FIG. 4 illustrates a process for multi-regional recalibration of data collected in a combined separation-MS measurement, according to another embodiment of the invention.

FIG. 4 illustrates a Multi-region Recalibration process 400 for recalibrating MS data collected in an MS measurement, e.g., a combined separations-MS measurement or analysis, according to another embodiment of the invention. ($START_1$). In the multi-regional recalibration method, mass spectra from a separation-MS analysis are collected 405. The MS dataset includes peaks (e.g., mass, or m/z) detected and/or measured in conjunction with an instrument-specific calibration function. The instrument-specific calibration function is any function of the form $(m/z)=F_i(phq_1, phq_2, \ldots phq_M, A_1, A_2, \ldots A_N)$, where $F_i$ is a calibration function chosen for a particular instrument type, ($phq_1, phq_2, \ldots, phq_M$) are any of from 1 to M measured physical parameters, and ($A_1, \ldots, A_N$) are any of from 1 to N selected instrument-specific calibration coefficients. A simple calibration function, e.g., $[m/z=A_0/(f+B_0)]$, is illustrative where $A_0$ and $B_0$ are instrument-specific calibration coefficients. The instrument-specific calibration function may be defined in terms of any number of primary physical properties or parameters, including, e.g., peak frequencies (f) (e.g., peak cyclotron frequencies); m/z values ($m/z_1, m/z_2, \ldots, m/z_{Nm}$); monoisotopic neutral masses ($m_1, m_2, \ldots m_{Nm}$); or like properties. Data to be compiled or determined are not limited. For example, data can consist of m/z values for peaks detected in the mass spectra in a course of on online separation, e.g., an LC-MS analysis. In the instant embodiment, peak frequencies (f) are used as a primary physical property in the calibration function (e.g., $[m/z=A_0/(f+B_0)]$), which are retained for calculation of m/z values for peaks detected or measured in the mass spectra. A secondary physical property, calibration parameter, or quantity derived therefrom known to influence accurate mass calibration of MS peaks measured in the set of mass spectra is also selected. Secondary physical properties, calibration parameters, or quantities derived therefrom include, but are not limited to, e.g., total ion current (TIC), total ion count, total ion intensity, m/z range, ion intensity, ion abundance, separation parameter, spectrum acquisition time, separation time, elution time, and the like or combinations thereof. Next, the set of MS peaks is partitioned into from 1 to K regions or groups of close values (i.e., all values that fall into each of the K regions) of the selected secondary physical property 410, e.g., total ion current (TIC), yielding a set of from 1 to K regions or groups of, e.g., peak frequencies correlated therewith 415. Frequencies for each of the K groups (e.g., $N_1, N_2, \ldots, N_K$) are listed from a first frequency ($f_1$) to an Nth frequency (i.e., $f_1, \ldots, f_{N1}$) in the specified group. Masses are derived from data in each of the 1 to K groups, e.g., $[(m_1, \ldots m_{N1}), (m_1, \ldots m_{N2}) (m_1, \ldots m_{NK}) (m_1, \ldots m_{Nm})]$. Optional deisotoping of the set of masses yields monoisotopic neutral masses. Other data handling steps can be likewise instituted as will be known by those of skill in the art. No limitations are intended. ($START_2$). Independently, or consecutively, a putative list of compounds ($comp_1$, $comp_2$, . . . , $comp_{Np}$) is also compiled 420, e.g., from databases or accepted research sources listing compounds expected to be present in a sample. A set of theoretical masses ($m^T_1$, $m^T_2$, . . . , $m^T_{Np}$) is calculated for compounds in the putative list of compounds 425. In the instant case, monoisotopic neutral masses from the MS dataset are compared to the set of theoretical or exact masses ($m^T_1$, $m^T_2$, . . . $m^T_{Np}$) identified from the putative list of compounds ($comp_1$, $comp_2$, . . . , $comp_{Np}$), where ($N_1$, $N_2$, . . . , $N_K$) represent the number of monoisotopic peaks in each of the 1 to K regions or groups and (Np) is the number of putative compounds. The comparison yields statistically matching and/or correlated pairs of mass values corresponding to each of the 1 to K regions or groups. In the instant embodiment, multi-regional recalibration 430 involves determining calibration coefficients [e.g., $(A_{s1}, \ldots, A_{sN})_1$, $(A_{s1}, \ldots, A_{sN})_2$, . . . , $(A_{s1}, \ldots, A_{sN})_K$] as described herein for each of the 1 to K regions or groups that minimize mass measurement error ($dM_s$) and mass error spread ($dM_w$) between matching pairs of mass values, optimizing the physical property values within each of the 1 to K regions or groups. A set of optimized coefficients is identified for each of the 1 to K regions or groups, providing for recalibration of the entire MS measurement dataset 435. As illustrated, recalibrated m/z values are calculated for each of the 1 to K regions or groups using the instrument-specific calibration function and the optimized coefficients that correlate with the selected group or region (e.g., of TIC values) and the particular set of retained primary physical property values [i.e., ($f_1$, . . . , $f_{N1}$)] thereby recalibrating (correcting) the data 440. Recalibrated m/z values ($m/z_1$, $m/z_2$, . . . , $m/z_{Nm}$) are subsequently compiled for MS peaks measured in the combined separation—MS measurement, thereby maximizing mass measurement accuracy and precision thereof 445. END.

Multi-regional recalibration takes variable mass measurement conditions into account and corrects the mass calibration according to multiple regions of parameters critical for accurate mass measurement of a specific m/z peak. The method is based on statistical matching of measured masses to a set of putative accurate masses, generally a subset of peptides previously identified by LC-MS/MS methods providing a database of data and information about the organism under investigation. Multiregional recalibration involves an automated analysis of mass accuracy histograms generated for each trial calibration. To compensate for calibration variations due to variable ion populations, mass spectra are grouped according to, e.g., the total ion current measured for each mass spectrum. Similarly, multiple regions of m/z, ion abundance, and elution time can be used. As a result, multiple calibrations are applied to individual separation-MS datasets, providing improvement in mass accuracy measurements within a narrow range of parameters.

The multi-region recalibration method has been evaluated for high throughput LC-MS measurements of microbial proteome samples, as well as for peptide mixtures (23 peptides and 12 proteins digested with trypsin) routinely used for quality control analyses. In all cases, substantial mass measurement accuracy improvement was obtained, achieving, e.g., a ~1 ppm accuracy for LC-FTICR analyses. Multi-region recalibration fully compensates for systematic mass measurement errors ($dM_s$) (a measure of accuracy) and minimizes mass error spread ($dM_w$) (a measure of precision). Thus, both accuracy and precision of mass measurements are substantially improved. The mass measurement improvement is virtually independent of the initial instrument calibration; thus, need for routine instrument calibration is reduced. The approach is robust for increasingly complex datasets that may involve >~$10^5$ entries of both experimental and putative accurate m/z values, and when only a fraction of the data has a true correspondence between measured and accurate masses. A generalized version of the recalibration procedure based on a linear adjustment of all measured m/z values does not require any information with regard to instrument calibration or require access to raw data. Multi-region recalibration described herein is a useful tool for processing LC-MS and similar types of data, e.g., in proteomics measurements, and provides improved mass measurement accuracies and precisions that result in increased certainty of identifications. In particular, mass measurement accuracy of LC-MS analyses is substantially improved using condition-specific multi-regional correction. The multi-region recalibration approach has been successfully demonstrated using MS data acquired with various MS systems, including custom and commercial FTICR systems, as well as TOF-MS and LTQ Orbitrap systems.

Multi-Dimensional Recalibration

Figure 5:
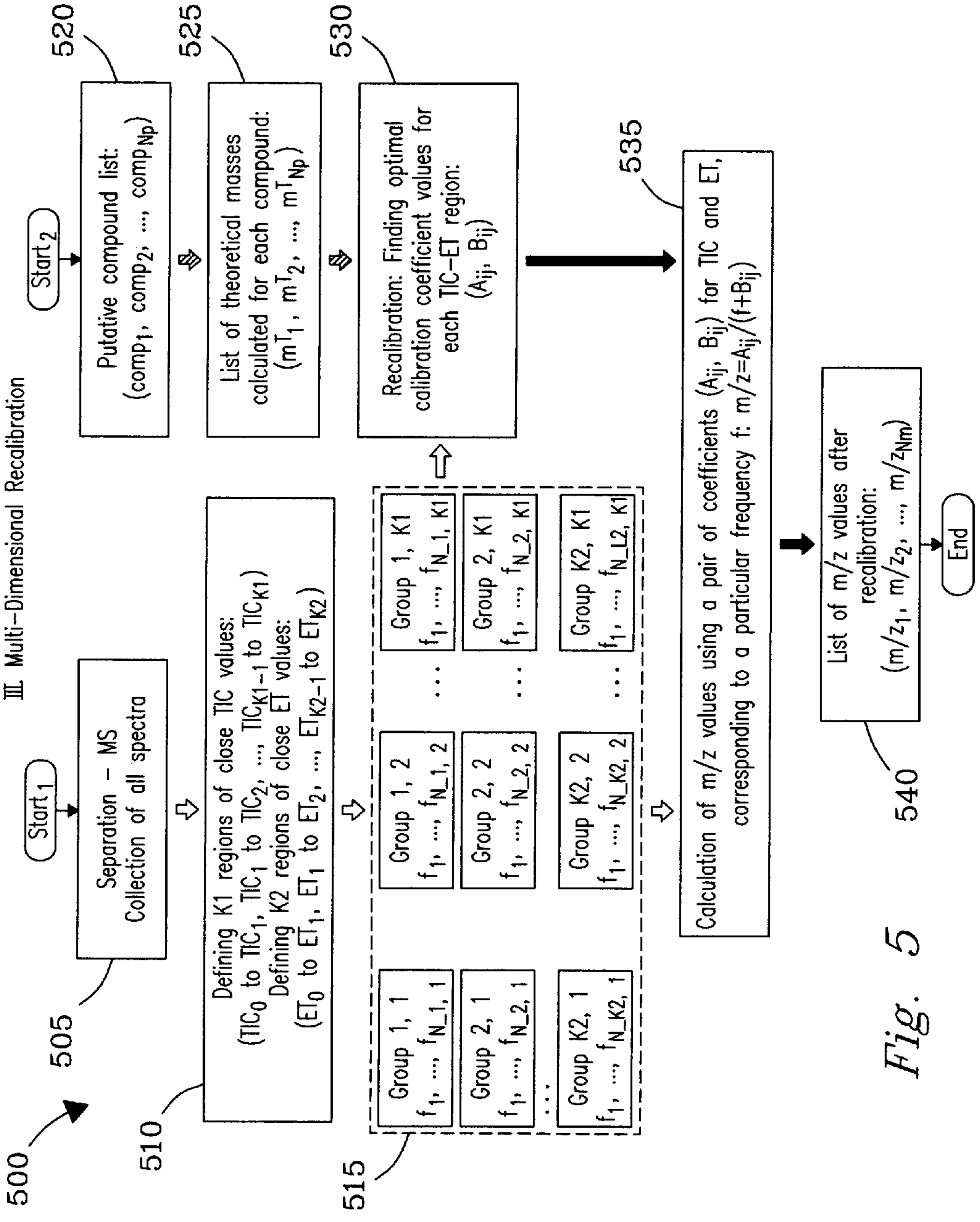
FIG. 5 illustrates a process scheme for multi-dimensional recalibration of data collected in a combined separation-MS measurement, according to yet another embodiment of the invention.

FIG. 5 illustrates a Multi-Dimensional Recalibration process 500 for effecting recalibration of MS data, e.g., obtained in a combined separation-MS measurement, according to another embodiment of the invention. ($START_1$). In the multi-dimensional recalibration method, mass spectra from a MS measurement or analysis are collected 505. An MS dataset includes MS peaks (e.g., mass, or m/z) detected and/or measured in conjunction with an instrument-specific calibration function. The instrument-specific calibration function is any function of the form $(m/z)=F_i(phq_1, phq_2, \ldots phq_M, A_1, A_2, \ldots A_N)$, where ($phq_1$, $phq_2$, . . . $phq_M$) are any of from 1 to M measured physical parameters, and ($A_1$, . . . , $A_N$) are any of from 1 to N selected instrument-specific calibration coefficients. The instrument-specific calibration function may be defined in terms of various primary physical properties, including, e.g., peak (or cyclotron) frequencies ($f_1$, $f_2$, . . . , $f_{Nm}$); m/z values ($m/z_1$, $m/z_2$, . . . , $m/z_{Nm}$), monoisotopic neutral masses ($m_1$, $m_2$, . . . $m_{Nm}$), and the like, or combinations thereof. Primary physical properties values used in the calibration function are retained for calculation of m/z values for mass spectral (m/z) peaks measured in the mass spectra. A set (M) of secondary physical properties, calibration parameters (parameters of calibration), or quantities derived therefrom known to influence accurate mass calibration of MS peaks measured in the set of mass spectra is also selected. 510. Secondary physical properties include, but are not limited to, e.g., total ion current (TIC), total ion count, total ion intensity, m/z range, ion intensity, individual ion intensity, ion abundance, time, separation time, separation parameter, spectrum acquisition time, elution time, and the like or combinations thereof. In the figure, two secondary physical properties are selected, providing K1 regions corresponding to total ion current (TIC) and K2 regions corresponding to elution time (ET). Next, MS peak data are partitioned into ($K_j$) regions or groups of close values corresponding to the selected set of (M) secondary physical properties, where (=1, . . . , M) denotes a physical property index correlated with each of the (M) secondary physical properties 515. The ($K_j$) regions or groups define a multidimensional (M-dimensional) (e.g., a 2-dimensional or 3-dimensional recalibration space. Each region or group in the space comprises a selected range or population of mass spectral (m/z) peak data correlated with the measured secondary physical property, parameter, or quantity. All physical characteristics associated with the peak data are retained including, but not limited to, e.g., frequencies, TIC values, ion intensities, abundances, and elution times. In the figure, frequencies for each group or region are listed from the first frequency (f1) in the specified group to an Nth frequency in the specified group [e.g., N1_1,1 (Group 1,1); N1_1,2 (Group 1,2); and etc.]. Monoisotopic neutral masses [$(m, \ldots m_{N1})$, $(m_1, \ldots m_{N2})$ $(m, \ldots m_{NK})$ $(m_1, \ldots m_{Nm})$] may again be derived by deisotoping of the mass data in each of the $(K_j)$ regions or groups. ($START_2$). Independently or consecutively, a putative list of compounds ($comp_1$, $comp_2, \ldots, comp_{Np}$) is also compiled 520, e.g., from database listings or accepted research sources containing a list of compounds of interest, from which theoretical masses ($m^T_1$, $m^T_2, \ldots, m^T_{Np}$) can be calculated for each compound in the putative list of compounds 525. Monoisotopic neutral masses [$(m_1, \ldots m_{N1})$, $(m_1, \ldots m_{N2})$ $(m_1, \ldots m_{NK})$ $(m_1, \ldots m_{Nm})$] derived from data in each of the $(K_j)$ groups in the M-dimensional space are compared to theoretical or exact masses ($m^T_1, m^T_2, \ldots m^T_{Np}$) identified and extracted from a putative list of compounds ($comp_1, comp_2, \ldots, comp_{Np}$), where ($N_1$, $N_2, \ldots, N_K, \ldots, N_M$) represent the number of monoisotopic peaks in each of the $(K_j)$ regions or groups and (Np) is the number of putative compounds, yielding statistically matching and/or correlated pairs of mass values in each of the $(K_j)$ regions or groups. Multi-dimensional recalibration involves determining calibration coefficients, e.g., $(A_{s1}, \ldots, A_{sN})_{i1, \ldots, iM}$ for each of the $(K_j)$ regions or groups in the M-dimensional space that optimize the secondary physical property. A set of optimized coefficients is provided for each of the 1 to K regions or groups, providing for recalibration of the entire MS measurement dataset 530. The coefficients minimize mass measurement error ($dM_s$) and mass error spread ($dM_w$) between matching pairs of mass values for each of the $(K_j)$ regions or groups in the M-dimensional space optimizing values within each of the 1 to K regions or groups corresponding to the secondary physical property of interest. In the figure, 2-D coefficients identified, i.e., $(A_{ij}, B_{ij})$, correspond to the secondary physical properties, i.e., TIC and ET, in the 2-D space. Optimized calibration coefficients for each of the $(K_j)$ regions or groups permit recalibrated m/z values for MS peaks in each of the $(K_j)$ regions or groups to be calculated using the instrument-specific calibration function and the retained primary physical property values 535. In the figure, coefficients $(A_{ij}, B_{ij})$ in the TIC-ET 2-D space permit calculation of recalibrated m/z values. Recalibrated m/z values ($m/z_1$, $m/z_2$, $m/z_{Nm}$) are subsequently compiled for MS peaks measured in the combined separation—MS measurement, thereby maximizing mass measurement accuracy and precision thereof 540. END.

Optional deisotoping of masses identified in each high resolution mass spectrum can provide a set of detected iso-structures (e.g., iso__1: m, z, $A_i$, iso__2: m, z, $A_i$, . . . ) having respective masses (m), charge states (z), and abundances ($A_i$) and/or other associated parameters (e.g., LC separation times). Identified iso-structures are matched with a list of putative compounds under a relaxed tolerance yielding potential calibrants having a set of monoisotopic masses (e.g. iso__1-$m_a$, iso__2-$m_a$ . . . ). The term "potential calibrants" as used herein refers to tentative matches between measured or detected m/z values and a set of putative compounds. Once identified, calibrants can then be used to generate a mass accuracy histogram, plotted as a function of a selected relaxed tolerance, e.g., ($T_{ppm}$). The term "relaxed tolerance" as used herein means a user-defined inclusion or acceptance range (e.g., $T_{ppm}=\pm30$ ppm) whereby mass attributions constituting a match (i.e., a correlated pair) between a measured mass or m/z value and a mass of a putative compound are accepted or rejected. At the selected relaxed tolerance ($T_{ppm}$) value, the correlated pair has a mass difference sufficiently small such that the absolute value is less than the tolerance value. Further, the tolerance value is selected larger than any possible inaccuracy contributed by, e.g., the MS measurement or instrument. Thus, a major fraction (e.g., >99%) of all potentially useful matches passes a tolerance threshold. Values exceeding the tolerance value or range are rejected as false attributions; values within the range are accepted as true attributions.

A typical LC-FTICR analysis may contain greater than about $10^5$ such isotopic compounds for complex samples. Each mass spectrum is analyzed individually, regardless of the elution profile of any single component. Mass measurement accuracy (MMA) of uncorrected (raw) data is characterized by means of a histogram of mass residuals (e.g., $dm_1$, $dm_2, \ldots dm_M$) or ($dm_1/m$, $dm_2/m, \ldots dm_M/m$). All mass, or m/z, values are then subjected to multidimensional recalibration, wherein mass calibration coefficients that maximize the mass accuracy in the histogram are determined according to parameters known to impact mass measurement accuracy (described further in reference to FIG. 8 hereafter). Once calibration coefficients are determined, m/z values from individual spectra are recalibrated (corrected). Following recalibration, resulting mass measurement accuracy (MMA) is again evaluated, e.g., in conjunction with a MMA histogram of mass residuals, allowing other and/or additional m/z values to be assigned with improved accuracy and precision. A mass correction/recalibration method will now be described.

Mass Correction & Recalibration

Figure 6:
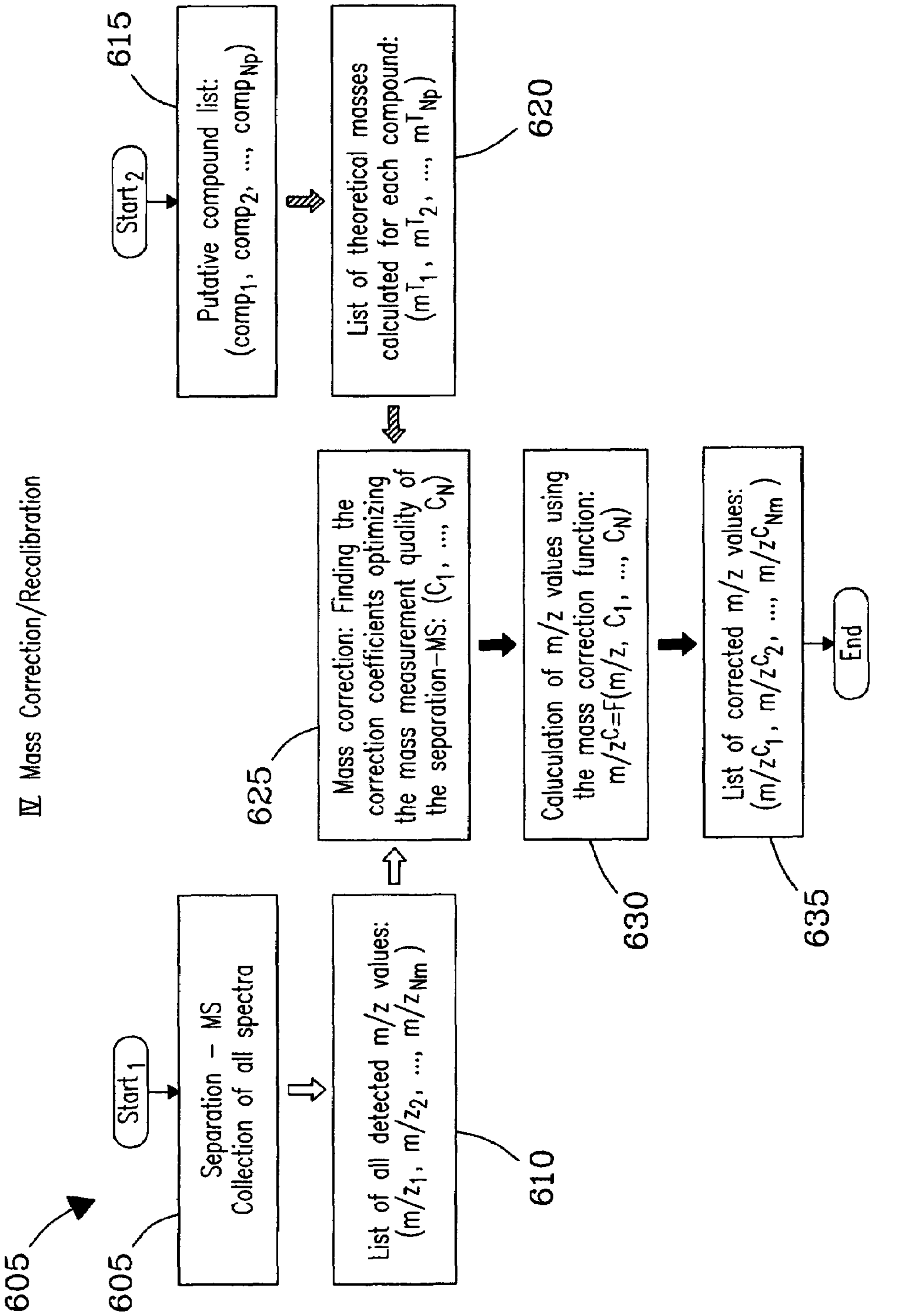
FIG. 6 illustrates a process scheme for mass (m/z) correction and recalibration of data collected in a combined separation-MS measurement, according to yet another embodiment of the invention.

FIG. 6 illustrates a Mass Correction and Recalibration process 600 for effecting recalibration of mass and/or m/z values collected, e.g., in a combined separation-MS measurement, according to yet another embodiment of the invention. The mass correction and recalibration method of the instant embodiment is similar to the general recalibration described in reference to FIG. 3, but is independent of any instrument-specific calibration function. A mass-correction function of the form $[(m/z_c)=[F_c(m/z, C_1, \ldots, C_N)]$ is employed, where (Fe) is a mass-correction function that provides for recalibration of raw (uncorrected) m/z values using a set of N-correction coefficients ($C_1, \ldots, C_N$), yielding corrected values, ($m/z_c$). Following equations are illustrative mass-correction functions, described further below (see Mass Correction/Recalibration):

$$m/z=C_0+C_1(m/z) \quad [1]$$

$$m/z_c=1/(C_0+C_1/(m/z)) \quad [2]$$

$$dm_r=C_0+C_1(m/z) \quad [3]$$

$$m/z_c=C_0+C_1(m/z)+C_2(m/z)^2+\ldots+C_2(m/z)^N \quad [4]$$

Equations [1-3] are of a simple linear regression form, and can be applied for correcting trends of MS data that are substantially close to linear, providing mass-correction/recalibration thereof. Equation [2] is useful for data derived, e.g., from FTICR-MS. In equation [3], ($dm_r$) is a relative m/z difference given by the expression: $[dm_r=(m/z_c-m/z)/m/z]$. Equations [1-3] can all be derived from an FTICR calibration function and yield similar results. Equation [4] is a generalized power-series function having terms suitable for mass correction/recalibration of various higher-order mass spectrometry datasets. No limitations are intended. All mass-correction functions as will be contemplated by those of skill in the art in view of the disclosure are within the scope of the invention.

($START_1$). In the m/z correction/recalibration method illustrated in FIG. 6, mass spectra from a separation-MS analysis are collected 605. Next, uncorrected. (raw) m/z values (e.g., $m/z_1$, $m/z_2$, . . . , $m/z_{Nm}$) are compiled 610. ($START_2$). Independently or consecutively, a putative list of compounds ($comp_1$, $comp_2$, . . . , $comp_{Np}$) is also compiled 615, from which a list of theoretical masses ($m^T_1$, $m^T_2$, . . . , $m^T_{Np}$) for compounds in the putative list of compounds are calculated 620. Mass correction involves determining correction coefficient values ($C_1$, . . . , $C_N$) that recalibrate (corrects) the separation-MS measurement data in the entire dataset 625. The optimized calibration coefficients permit recalibrated m/z values to be calculated using the mass correction calibration function 630. A set of corrected m/z values ($m/z^c_1$, $m/z^c_2$, . . . , $m/z^C_{Nm}$) may then be compiled 635. END.

Binning of peak data for purposes of multi-dimensional recalibration will now be described.

Peak Binning for Multi-Dimensional Recalibration

The multi-dimensional recalibration method of the invention applies separate calibrations (e.g., different pairs of calibration coefficients values) for peaks that are binned based upon, e.g., summed spectrum intensities, m/z values, peak intensity, and LC separation time, resulting in more accurate mass measurements for complex datasets such as proteomics datasets having a large number of detected species (>$10^5$) and sets of possible known compounds (i.e. for matching) of roughly similar size. Multi-dimensional recalibration improves the quality and/or the number of identifications from accurate mass measurements, and has been initially evaluated for complex mixture of peptides used for global "bottom-up" proteome analyses. Multi-dimensional recalibration is based on a statistical matching of experimental (measured) mass values obtained in an analysis relative to putative mass values. Putative listings are compiled from sources including, but not limited to, e.g., known databases, research libraries, literature compilations, theoretical or exact masses, as well as experimentally derived compilations, e.g., from self conducted MS/MS experiments. Large lists (e.g., with >~$10^5$ entries) of data can be used for comparing and matching of experimental and putative accurate m/z values, with matching requiring only a fraction (e.g., 1%) of data exhibiting a true correlation or correspondence within any selected source listing.

Figure 7:
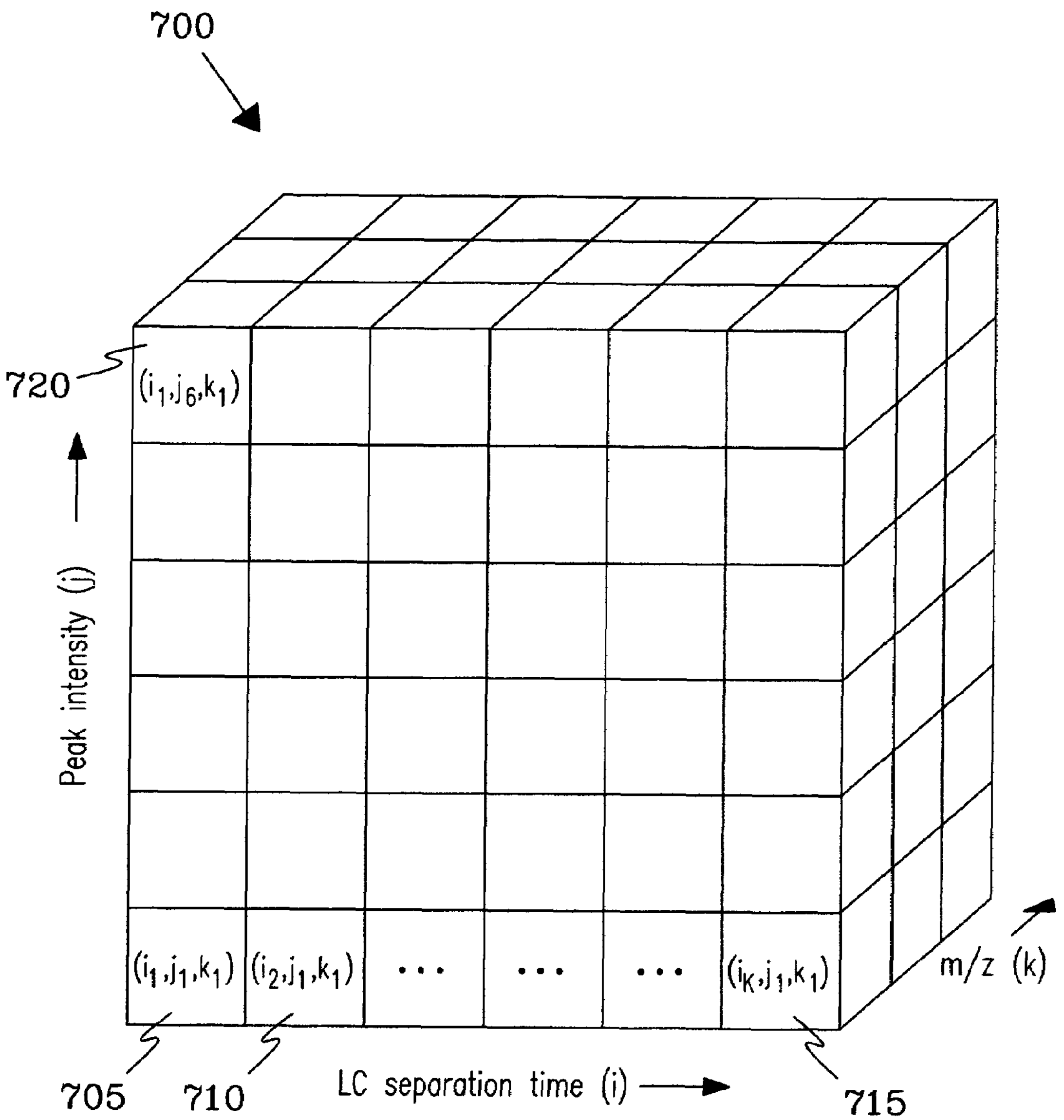
FIG. 7 is a diagram illustrating the process of binning of peak data according to a multidimensional space of parameters that impact mass measurement accuracy, according to another embodiment of the invention.

FIG. 7 is a diagram illustrating binning (i.e., grouping in respective bins) of peak data for purposes of multi-dimensional recalibration, according to an embodiment of the invention. Recalibration of data from a multidimensional space of parameters that impact mass measurement accuracy can be effected in conjunction with an N-dimensional data array.

In the way of non-limiting example, a 3-dimensional data array 700 is illustrated for use in conjunction with a 3-dimensional recalibration. In the instant illustration, MS measurement data are collected for three (3) physical properties or parameters known to impact mass measurement accuracy. In the instant example, parameters selected are separation time, ion (peak) intensity, and m/z, but are not limited thereto. A number of intervals or selected ranges are chosen for each of separation time, ion (peak) intensity, and m/z. In the figure, separation time (e.g., LC separation time) is plotted along the X-axis. Peak intensity is plotted along the Y-axis, and m/z value is plotted along the Z-axis, but is not limited. Here, m/z values obtained in the course of separation—MS measurements are grouped according to the illustrated parameters that impact the mass measurement accuracy. Thus, a three-dimensional collection of array bins is generated, but is not limited. Each data bin (cell) in array 700 can be correlated to a specific axis index, e.g., (i) for X-axis, (j) for Y-axis, and (k) for Z-axis, respectively. Each data bin has a separate index and location within the array. Numeric values are used to identify the cell positions in array 700, e.g., ($i_1$, $j_1$, $k_1$) as a first data bin (cell) 705 at position values X=1, Y=1, and Z=1 of the respective axes of the 3-dimensional array. Other cells and positions may be likewise identified. At axis values X=2, Y=1, and Z=1, another data bin (cell) is identified, e.g., ($i_2$, $j_1$, $k_1$) 710. A Kth position along the X-axis at X=K, Y=1, and Z=1 yields cell ($i_K$, $j_1$, $k_1$) 715. Likewise, at position X=1, Y=6, Z=1, cell ($i_1$, $j_6$, $k_1$) 720 is identified.

Optimal calibration coefficients identified and applied as described herein provide for multi-dimensional recalibration of the data within the array. In particular, optimal calibration coefficients are applied to data within each of the indexed bins of the array, recalibrating data therein, as described hereafter.

Optimized Calibration for an Illustrative Instrument: (FTICR-MS)

The method of recalibration described herein is applicable to a variety of calibration functions, algorithms, or instrument types. As an illustrative but non-limiting example, the calibration function for an FTICR mass spectrometer (FTICR-MS) is used, denoted in Equation [5]:

$$(m/z) = \frac{A}{(f+B)} \qquad [5]$$

Here, (f) is a measured peak cyclotron frequency obtained from a frequency domain FTICR spectrum, A is a first calibration coefficient (e.g., a magnetic field coefficient), and B is a second calibration coefficient (e.g., an electric field coefficient). Other coefficients may be present and likewise defined. In the present example, coefficients (A, B) have values defined using a mass spectrum derived in conjunction with a sample calibration mixture of known constituents. Coefficient values are selected that provide the best achievable mass accuracy for conditions of the calibration. External calibration is accurate only when the number of ions trapped in the FTICR cell is very small or is the same for both the calibration and the acquisition of measurement spectra. However on-line separations typically produce an ion current that varies according to the separation process, and sometimes is much greater than the optimum. Variable ion population is a major contributing factor to cyclotron frequency shifts observed in FTICR measurements. Further, separation-MS of a complex mixture is characterized by highly variable ion intensities distributed over a wide m/z range in a time-variable fashion, which creates deviations from the calibration values (A, B) obtained externally. Thus, conditions during an LC separation stage can deviate considerably from those used for the MS instrument calibration. Thus, optimal calibration coefficients ($A_s$, $B_s$) different from (A, B) are generally required.

In one embodiment, recalibration (and algorithm) determines an optimal calibration for a particular dataset (e.g., an LC-MS dataset) using the effective internal calibration from compounds (e.g., a list of putative compounds) likely to be present (e.g. PMT tags) and additionally does so for binned peaks so as to allow many separate calibration coefficients to be applied to various subsets of data, e.g., for measured peaks. As will be understood by those of skill in the art, it is not generally possible to unambiguously assign a detected species to a specific candidate species with an accurate mass due to the large number of potential candidates and a substantial probability of multiple false attributions. And, an often significant fraction of detected peaks will have no correlation with a putative list of compounds, or vice versa. However, such challenges are not limiting here. Recalibration of the instant embodiment involves compiling a list of statistically correlated matches between measured m/z values and theoretical masses determined from a list of putative (exact) compounds (e.g., a putative calibrant list) or from a list of PMT tags. Groups (e.g., Group_1, Group_2, Group N) are compiled consisting of statistically correlated mass value pairs compiled by comparing a set of measured m/z values or masses determined from a measured physical property (e.g., measured peak cyclotron frequencies (f) in the case of FTICR or ion flight time in a TOF-MS to a set of masses ($m_a$) from a putative list of compounds (see FIG. 3). The statistically correlated mass pairs have a mass deviation that is smaller than a specified tolerance ($T_{search}$) defining a mass accuracy, as given by equation [6]:

$$|m/z_0 - m/z_a| < |T_{search}| \quad [6]$$

Here $m/z_0$ is the mass-to-charge ratio corresponding to initial instrument calibration coefficients ($A_0$, $B_0$) as given by equation [7]:

$$m/z_0 = A_0/(f+B_0) \quad [7]$$

The selected tolerance ($\pm T_{search}$) is given a value larger than the expected mass measurement (accuracy) error ($dM_s$) to ensure that most if not all possible correct attributions fall or are otherwise included within the selected mass accuracy range, capturing the peak maximum within the selected tolerance range. In typical LC-FTICR analyses, for example, a conservative tolerance value is 30 ppm, covering a range from about −30 ppm to about +30 ppm (i.e., $T_{ppm}=\pm 30$ ppm), but is not limited thereto. No limitations are intended.

Figure 8:
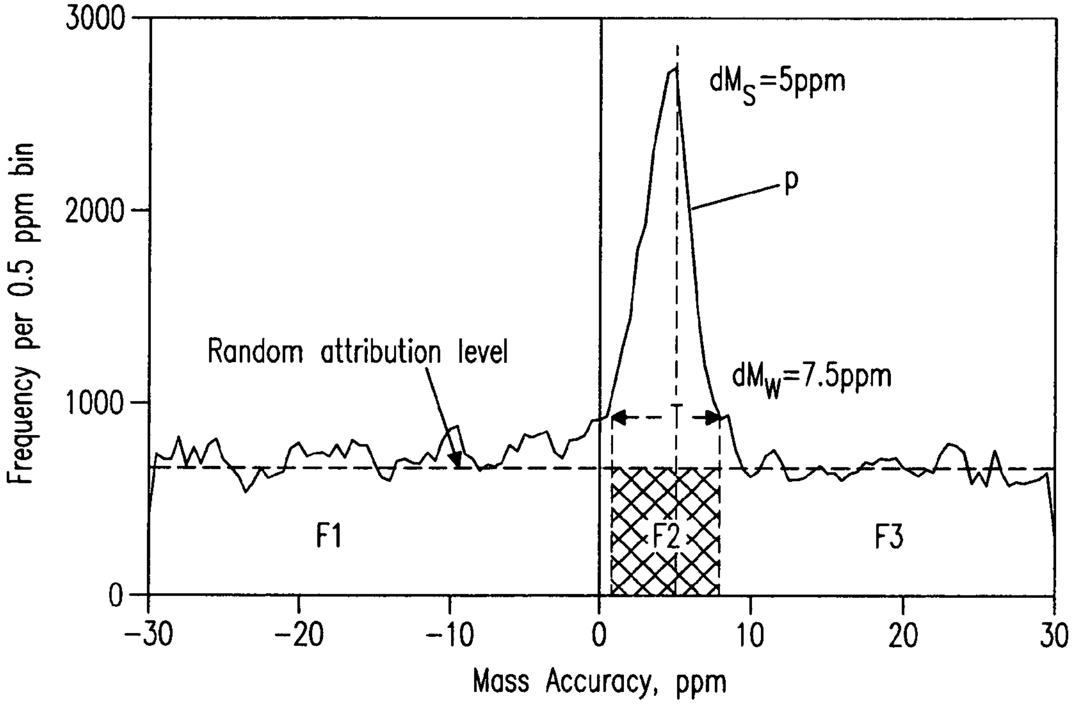
FIG. 8 illustrates a mass residual histogram showing mass accuracy spread and mass precision data used for mass accuracy characterization, according to another embodiment of the invention.

FIG. 8 is illustrative of mass measurement accuracy (MMA) histograms used to characterize mass accuracy for determining calibration coefficients, according to various embodiments of the invention. The histogram is generated from a list of tentatively matched putative calibrants. In the figure, the count frequency or number of statistically correlated mass value (calibrant) pairs per bin (e.g., a 0.5 ppm bin) is plotted as a function of mass error or deviation ($dM_s$). The random attribution level, or probability of random attributions, is shown by the horizontal dashed line. Random attribution level is insensitive to (does not change with) the initial calibration coefficients values, and is proportional to the number of putative compounds times the number of experimentally measured or observed species. In the histogram, peak (P) has an area (T) that correlates to the true attributions. The area is defined by a frequency of hits exceeding the random attribution level. The probability of correct attribution increases above the random attribution level in the MMA area where true attributions are centered, resulting in the peak. Areas (F1), (F2), and (F3) correspond to false attributions. Width of the histogram peak (P) gives an estimation of the error spread ($dM_w$). Position of the peak maximum provides a measure of the systematic error ($dM_s$). Certainty of attribution (e.g., prior to applying elution time constraints) can be estimated from the ratio of true attribution area (T) to total area (T+F2) corresponding to width ($dM_w$). The histogram takes the form of a table of occurrence frequencies as a function of mass deviations expressed in, e.g., parts per million (ppm). The mass deviation $[(m/z_0-m/z_a)/(m/z_a)]$ is incremented in bins covering the relaxed tolerance range from ($-T_{search}$) to ($+T_{search}$). For example, as expressed in parts per million (ppm) terms, ($\pm T_{search}$)=($\pm T_{ppm}$). The occurrence frequency is calculated as a total number of all putative calibrants that fall in a particular mass deviation bin. The histogram provides an initial approximate determination of false and true attributions between the lists of putative calibrants and detected species. False attributions distribute according to the normal (approximately Gaussian) distribution with a characteristic width, e.g., 100 ppm, as follows, e.g., from a peptide mass distribution of possible amino acid compositions, e.g., for peptide masses ~$10^3$. For absolute mass deviations <<100 ppm, false attributions can be approximated by a uniform distribution, e.g., by an approximately flat, plateau-like portion of the histogram. The mass accuracy histogram enables determination of the following: a) systematic mass measurement error ($dM_s$), given by position of a histogram peak maximum relative to the (0 ppm) position. The centroid can also be used, but the peak maximum provides a more stable measure as it is less influenced by the wings of asymmetric distributions; b) the mass measurement error variation ($dM_w$), given by the width of peak (T) measured at a specific level (e.g., 10%) above the random attribution level or frequency; c) an estimate of the certainty of attribution, calculated as a ratio of the true attribution area (T) to the total area (T+F2) corresponding to the width ($dM_w$) or alternatively, the selected mass accuracy tolerance. Note that this is a lower estimation of the matching certainty, based on mass accuracy only. Full AMT tag strategy takes into consideration LC elution time constraints, which gives an additional reduction in false positive assignments of greater than about 10 times. Clear determination of histogram areas requires an optimal choice of bin size. Small bin sizes lead to noisy histograms that are difficult to interpret. Alternatively, bin sizes larger than ($dM_w$) result in a distortion of the true attribution area. Bin sizes of typically from about 0.2 ppm to about 0.5 ppm are reasonable for LC-FTICR data, but depend in instrument type and data being analyzed, and thus are not limited thereto.

In the instant example, calibration coefficients ($A_s$, $B_s$) are determined by adjusting either of the initial calibration coefficients ($A_0$, $B_0$). The aim is to reduce both the systematic error ($dM_s$) and the mass error spread ($dM_w$) by simultaneous and iterative adjustment of both coefficients. For example, a positive average mass error can be corrected by decreasing the (A) coefficient or increasing the (B) coefficient. Calibration coefficients are changed in small increments, and for each pair, the mass error parameters ($dM_s$) and ($dM_w$) are calculated. Ultimately, a pair of coefficients ($A_s$, $B_s$) that minimize the ($dM_s$) and ($dM_w$) errors provide new calibration coefficients for recalibrating a given dataset. Detected m/z values are then recalibrated (corrected) in conjunction with the new calibration coefficients ($A_s$, $B_s$) thereby maximizing the mass accuracy and precision of the histogram peaks, as will be observed in a mass accuracy histogram plotted following recalibration. All actions as will be implemented by those of skill in the art in view of the disclosure fall within the scope of the invention. No limitations are intended. Additional details for implementation of a recalibration algorithm will now be described.

Histogram Maximization and Recalibration

Histogram maximization, according to an embodiment of the invention, includes generating one or more initial (trial)

calibration coefficients, followed by calculating and plotting a histogram comprised of matches between measured and putative masses for each of the one or more calibration coefficients identified. A central histogram bin number for each of the trial calibration coefficients is determined such that values for calibration coefficients that produce a maximum central histogram bin number determines coefficient values optimized for recalibrating MS data in the measured MS dataset. Calibration coefficients may be generated, e.g., in conjunction with an instrument-specific calibration function or without an instrument specific calibration function, as described herein.

Optimization Algorithm: Additional Details of Implementation

Optimization of initial calibration coefficients ($A_0$, $B_0$) is effected using small differentials, increments, or calibration variations, denoted by terms (dA) and (dB), respectively. Values for (dA) and (dB) are each increased or decreased in generally small increments or steps ($D_{ppm}$). The search involves, i.e. iterative addition of a small (~0.1 ppm) increment to each of A and B coefficients, according to the following expressions [8], [9], [10], and [11]:

$$dA=A_0 \cdot D_{ppm} \quad [8]$$

$$dB=f_0 \cdot D_{ppm} \quad [9]$$

$$f_0=A_0/m/z_{max} \quad [10]$$

$$A_i=A_0+i \cdot dA;\ i=0,\pm 1+2, \ldots, \pm N \quad [11]$$

Here, ($f_0$) is a parameter for peak frequency at the upper limit of the m/z range, (i.e., $m/z_{max}$); (i) is an index ranging from −N to +N in increments of 1, or alternatively the number of iterations used in the searching process that includes a wide range of all possible values of the calibration parameters. Calibration coefficients (A, B) are ultimately incremented such that a resulting change of m/z is equal to the set value of ($D_{ppm}$). A typical step size for LC-FTICR data is ($D_{ppm}$)=0.1 ppm, but is not limited. For example, a $D_{ppm}$ increment of, e.g., 1 ppm, 2 ppm, or greater may be initially used to rapidly locate a peak maximum, following which a smaller $D_{ppm}$ increment of, e.g., 0.5 ppm may be used. Subsequently, a still smaller $D_{ppm}$ increment may be used to maximize the accuracy and precision of the peak maximum. No limitations are intended. All increment or step sizes and sequences of same as will be implemented by those of skill in the art are within the scope of the disclosure.

The range of variation (e.g., ~30 ppm) is selected to cover the selected relaxed tolerance range, ($\pm T_{search}$) or ($\pm T_{ppm}$). Many (~1 million) of initial (trial) calibrations are typically generated, all of them covering the larger range of the total (e.g., ~30 ppm) variation. The pair of calibration coefficients ($A_s$, $B_s$) is identified based upon the best peak maximum achieved in the histogram.

Mass accuracy analysis is done for each pair of calibration coefficients in order to find an optimized pair of calibration coefficients ($A_s$, $B_s$). Following is an illustrative approach that simplifies and speeds up the automated histogram analysis. Instead of calculating the whole histogram, only the central bin value ($nH_0$) is defined in each step of the search process for recalibration. The value is equal to the total count of putative calibrants that fall inside the central bin (i.e., for mass error around 0 ppm) for a trial pair of calibration coefficients (A, B), determined from expressions [12] and [13]:

$$|m/z-m/z_a|<D_{HM}/2 \quad [12]$$

$$m/z=A/(f-B) \quad [13]$$

Here ($D_{HM}$) is the histogram bin size. The values ($nH_0$) are calculated for all trial pairs of coefficients and stored in a form of 2D matrix. A pair of coefficients (A, B) that produces the largest $nH_0$ is chosen as the final optimized calibration coefficients ($A_s$, $B_s$).

This simplified approach is applicable in cases typically encountered where the histogram peak area (T) (FIG. 8) is roughly the same for all trial calibrations in a given dataset, since the area is defined by the absolute total number of true calibrants available, all of which should fall inside the relaxed tolerance ($T_{search}$) margins. The random hits level is less sensitive to the choice of calibration (calibration coefficients) and is maximized around the normal distribution maximum, which is shifted to (0 ppm) for calibrations that produce a negligibly small systematic error. In general, a narrower histogram (i.e. better overall mass precision) should have greater amplitude. Thus, the histogram maximization procedure based upon the central bin maximization produces a minimized histogram width, i.e. minimal possible error spread ($dM_w$). Searching for the central value maximum (e.g., about "0" ppm) is preferred, as calibration coefficients that yield zero systematic error (i.e., $dM_s$=0) are of primary interest, but should not be deemed limiting. Because the search is of a statistical nature, there is no exact solution. Thus, calibration coefficients ($A_s$, $B_s$) represent a best approximation for a calibration solution given the variability in the measured parameters. Results are sensitive to the value of histogram bin size ($D_{HM}$), which should be small enough for the desired accuracy, but large enough to provide a statistically sufficient number of putative calibrants (tentative matches between measured m/z values and the putative list). Total number of variation steps ($2T_{search}/D_{ppm}$) is >~1000 for each of the two calibration coefficients, or >~$10^6$ combinations of all possible pairs. To speed the search process, an iterative procedure that starts with a rough step ($D_{ppm}$)=~1 ppm and then gradually reducing the step size and the range of search is used such that the accuracy histogram maximum remains inside the search scope. In a typical course of iterations, central bin width ($D_{HM}$) is reduced proportionally to ($D_{ppm}$), as given by the expression in equation [14]:

$$D_{HM}=C_{bin} \cdot D_{ppm} \quad [14]$$

Here, ($C_{bin}$) is a coefficient of the bin width and ($D_{ppm}$) is the variation step. A typical value for coefficient ($C_{bin}$) is 4, but is not limited thereto. The variation step ($D_{ppm}$) is reduced by a factor of $2^{0.5}$ at each subsequent iteration. This scaling factor is sufficiently small for a stable operation and gives a convenient scaling law of powers of 2. The iterative procedure is terminated when the bin size ($D_{HM}$) reaches a pre-set minimum D_HM. The D_HM value sets a desired level of the calibration refinement. If D_HM is too small, it can produce poor calibration because of poor statistics. Reasonable values for D_HM for LC-FTICR datasets is from about 0.2 ppm to about 0.5 ppm, but is not limited. After recalibration is complete, mass measurement accuracy may again be characterized using a mass accuracy histogram. The two histograms for initial (raw) and refined calibrations allow visual comparison of results and full width at half maximum (FWHM) for true attribution peaks of each histogram. TABLE 1 lists recalibration data obtained from recalibration histograms, described further hereafter.

TABLE 1

Recalibration data for recalibration histograms generated from analysis of a standard QC peptide mixture.

| Figure | Putative masses | Potential calibrants[1] | $dM_s$ raw, (ppm) | $dM_w$ raw, (ppm) | Max, raw[2] | $dM_w$ after re-cal, (ppm) | Max, after re-cal[2] |
|---|---|---|---|---|---|---|---|
| 8a | 4208 | 49690 | 20.0 | 2.73 | 3800 | 1.93 | 5229 |
| 8b | 4208 | 49690 | 20.0 | 2.73 | 3800 | 1.03 | 8519 |
| 9 | 15004 | 100926 | 5.0 | 3.91 | 2742 | 0.83 | 7339 |
| 11 | 4208 | 19246 | −0.6 | 1.21 | 1291 | 0.66 | 2548 |
| 12a | 2103 | 23822 | 19.5 | 3.02 | 1789 | 1.07 | 3988 |
| 12b | 2103 | — | 20 | 2.47 | 2016 | 1.28 | 3796 |
| 13 | 4208 | 124137 | 20.0 | 45.0 | 2850 | 6.8 | 7748 |

Figure 12:
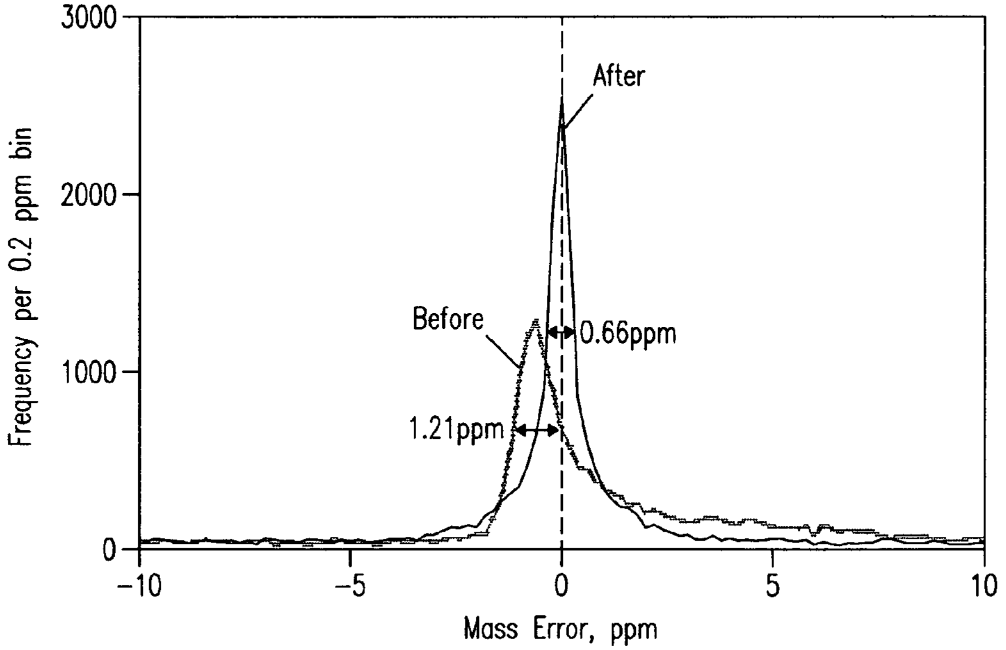
FIG. 12 illustrates a mass accuracy histogram obtained from analysis of a QC peptide mixture in a combined LC-(LTQ) FT MS instrument, showing mass accuracy improvement resulting from a general recalibration method, according to another embodiment of the invention.
Figure 14:
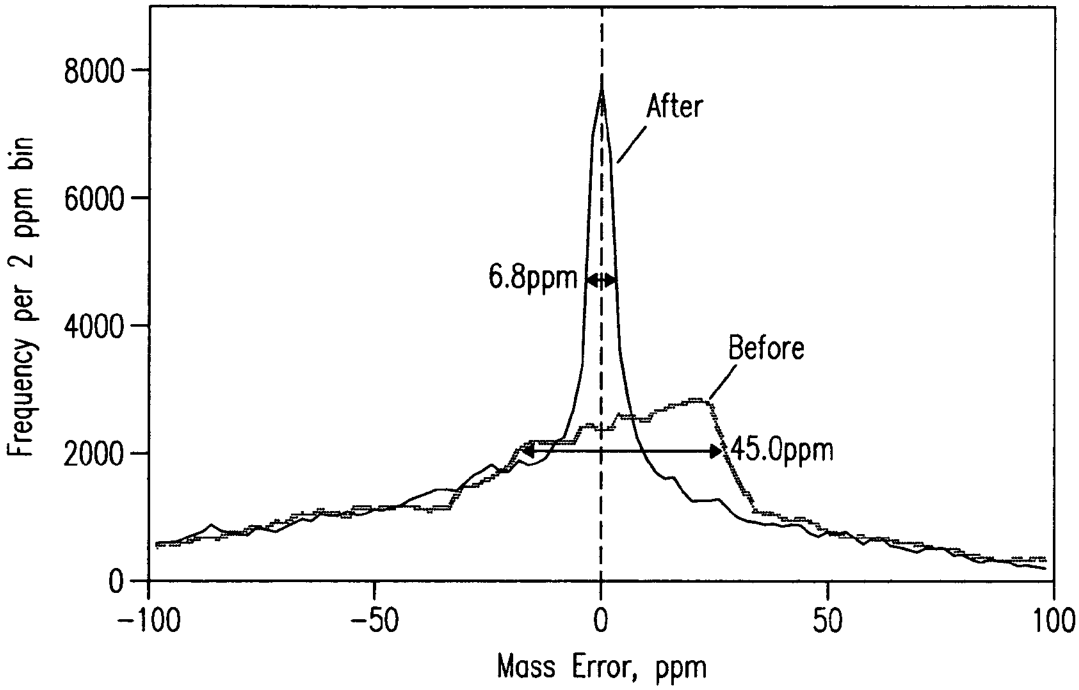
FIG. 14 illustrates mass accuracy histograms obtained from analysis of a QC peptide mixture in a combined LC-TOFMS experiment showing mass accuracy improvement resulting from multi-dimensional recalibration, according to another embodiment of the invention.

[1]Tolerance is 30 ppm for all Figures, except 10 ppm for FIG. 12, and 100 ppm for FIG. 14.
[2]Histogram peak maximum counts per 0.5 ppm bin, except 0.2 ppm bin for FIG. 12, and 0.2 ppm bin for FIG. 14.

Figure 9A:
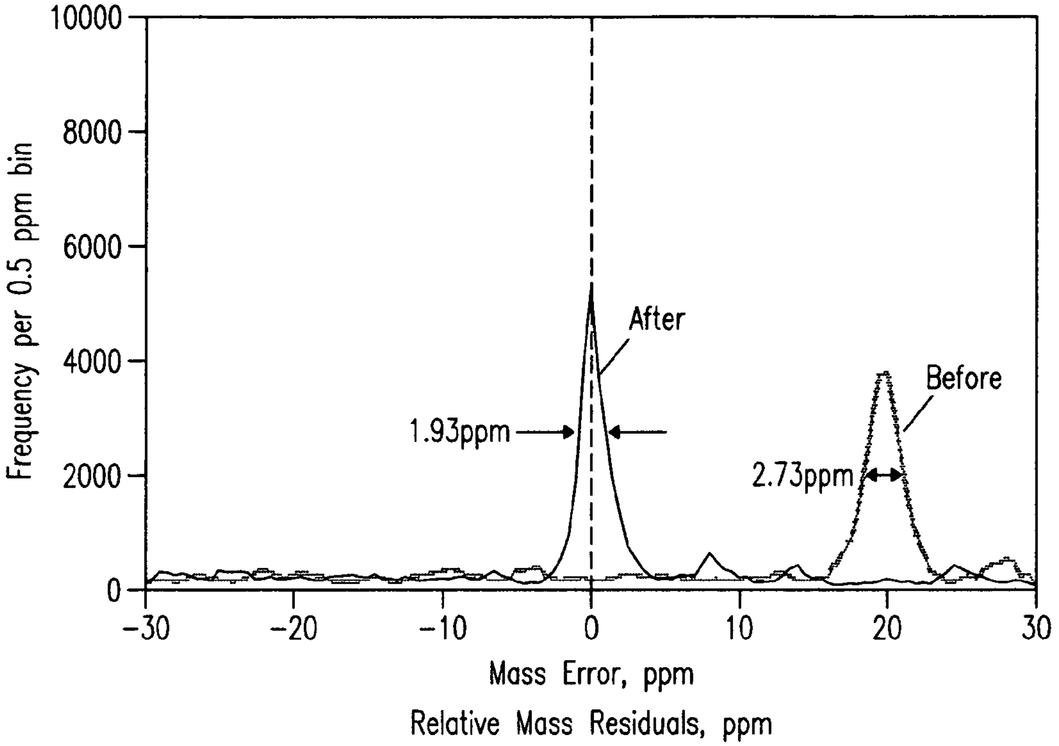
FIG. 9*a* presents recalibration histograms obtained for a QC peptide mixture from LC-FTICR MS analysis before and after recalibration using a single region recalibration method, according to another embodiment of the invention.
Figure 9B:
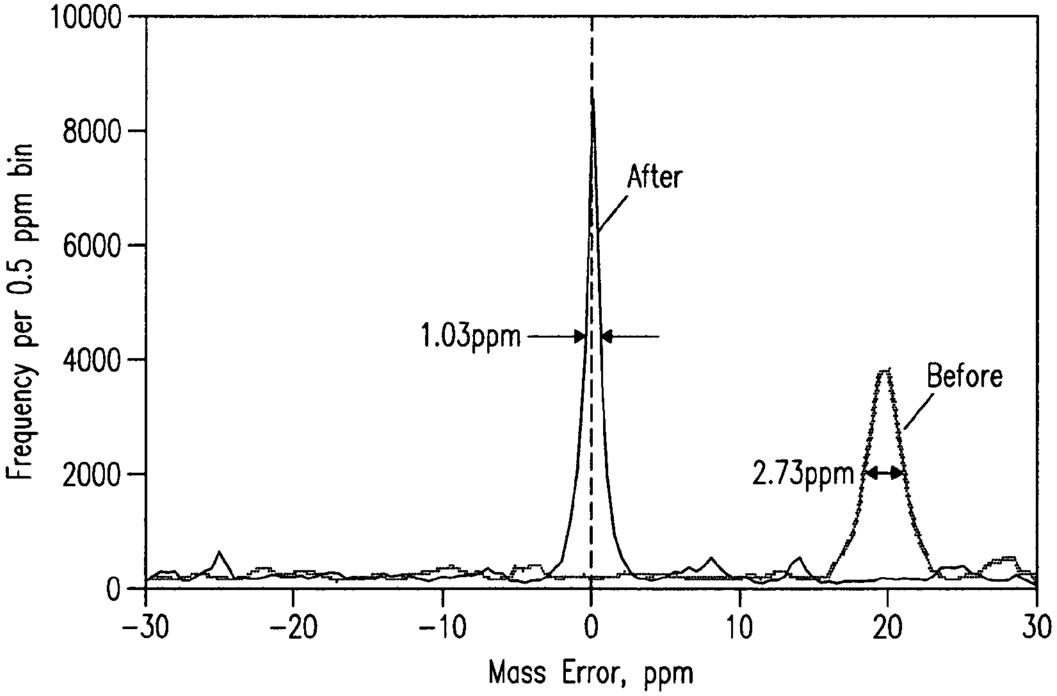
FIG. 9*b* presents recalibration histograms obtained for a QC peptide mixture from LC-FTICR MS analysis before and after recalibration in conjunction with a multi-dimensional recalibration method, according to another embodiment of the invention.

FIGS. 9*a*-9*b* show mass accuracy histograms generated using data obtained from analysis of a standard QC peptide mixture using a custom 11 Tesla LC-FTICR-MS instrument. The instrument is described, e.g., by Bruce et al. (Anal. Chem. 1999, 71, 2595-2599) and/or Harkewicz et al. (J. Am. Soc. Mass Spectrom. 2002, 13, 144-154). Number of matches per 0.5 ppm bin is plotted as a function of the mass measurement error (ppm). All 144,382 detected mono-isotopic masses from the analyses (including species observed in multiple spectra as a peak elutes from the LC) are compared to 4208 previously identified (i.e., putative) peptide PMT tags using a tolerance ($T_{ppm}$) value of ±30 ppm (i.e. from −30 ppm to +30 ppm), resulting in 49,690 potential calibrants spread across the set of mass spectra. Results before (i.e., raw instrument calibration) and after recalibration are shown. FIG. 9*a* presents histograms obtained before and after a general recalibration of the invention described herein, wherein a single set of improved calibration coefficients is applied to the entire LC-MS dataset. The initial instrument calibration (before) yields a positive mass shift ($dM_s$) for all m/z values of 20 ppm. After recalibration, mass error distribution maximum is centered at "0" ppm and mass error spread ($dM_w$) is improved from 2.7 ppm to 1.9 ppm. FIG. 9*b* presents histograms obtained before and after a multi-dimensional recalibration described herein, wherein recalibration is applied over the following calibration regions: 4 regions for TIC, 4 for m/z, and 4 for individual peak intensity, yielding a total of 64 (4×4×4) 3-dimensional (3-D) regions, but is not limited thereto. As in FIG. 9*a*, initial instrument calibration (before) yields a positive mass shift ($dM_s$) for all m/z values of 20 ppm. After recalibration, mass error distribution maximum is centered at "0" ppm and mass error spread ($dM_w$) is improved from 2.7 ppm to 1.9 ppm. Results show both the mass accuracy and precision are maximized by means of multi-dimensional recalibration.

Multi-dimensional recalibration is performed under conditions as close as possible to the measurement conditions. Since measurement conditions can vary in, e.g., the course of LC-MS measurements (e.g. as mixture composition, sample complexity, and average m/z values change), parameters for achieving optimal recalibration will similarly vary. An important factor for FTICR mass measurements, for example, is the total population of ions present in the trapped ion cell during detection. Under idealized conditions, increased ion populations cause an increased frequency shift of all peak frequencies detected. This global frequency shift can be introduced into the calibration equation. For example, in the case of the calibration formula denoted in equation [5], the frequency shift component may take the form of a (B) coefficient being a function of the ion population. Unfortunately, this idealized scheme provides only a minor mass accuracy improvement at best. One reason for this is the practicality of obtaining a direct and reliable measure of the ion population. The ion population is roughly related to the total signal, but this correlation suffers from uncontrolled variations of different ion transient durations and m/z biases, e.g. resulting from ion kinetic energy variations and trapping potential unharmonicity. Thus, in practice both the (A) and (B) coefficients are influenced, and the variations cannot be compensated by use of an additional total ion signal dependent calibration term.

To address this challenge, recalibration methods described herein can use multiple calibrations for a single separation-MS dataset. One parameter that can influence calibration is total ion current (TIC). For example, to compensate for calibration variations due to variable ion population, mass spectra can be grouped according to total ion current (TIC) values measured from the summation of peak intensities in each mass spectrum. The number of groups ($N_{TIC}$) may vary from 1 (meaning no division into groups) to greater than 100. Each group contains mass spectra with TICs falling inside a certain interval of TIC values, i.e., a TIC region. TIC regions are defined such that all potential calibrants are distributed evenly between all regions. This is done by sorting all putative calibrants with respect to the TIC value of a corresponding mass spectrum and choosing equidistant intervals in the sorted list. After groups of mass spectra are selected, recalibration is performed for each group individually using the sequence. As a result, instead of one calibration common for the whole LC-MS dataset, a number of different calibrations is obtained, each one maximizing mass accuracy and precision within a narrow TIC range, greatly improving recalibration accuracy.

Another parameter that can influence calibration is m/z-range. Under conditions of a significant perturbation of a calibration law, calibration precision can be improved if a narrower mass range is used. A parameter ($N_2$) sets a number of m/z ranges for recalibration where all potential calibrants are evenly distributed among the mass regions, similar to TIC regions described above. When several mass regions are used, potential calibrants from one mass spectrum can fall into different groups and a particular mass spectrum may have several calibrations effective over different m/z-regions. Recalibration was found to further narrow the width of the mass accuracy histogram (i.e. improve mass measurement precision) after recalibration. Alternatively, the ($N_2$) parameter can be used to divide LC separation time in a given number of ranges, which can be useful when instrument calibration has significant temporal variation. Significant temporal variation is not generally expected for LC-FTICR measurements, with the exception of Linear Quadrupole Ion Trap Fourier Transform Ion Cyclotron Resonance (LTQ-FT) instruments, considered below. Minor temporal variations of a calibration may occur due to TIC variations with elution time or, more significantly, with TOF-MS due to temperature changes.

Accurate FTICR calibration can also depend on how individual ion abundances are distributed along the m/z range of measurements. Individual peak intensity is also important for calibration of TOF mass analyzers. Thus, as an additional option for multi-dimensional (multi-region) recalibration, a parameter ($N_{Ai}$) can be included representing multiple regions of individual ion intensities.

The division into groups or regions using the three parameters ($N_{TIC}$), ($N_2$), and ($N_{Ai}$) produces a 3-dimensional (3-D) space of calibration conditions (described previously with reference to FIGS. 5 and 7). 3-dimensional calibration is illustrative of any N-dimensional calibration and is chosen for practical reasons, but number of parameters is not limited. Multi-region (multi-regional) recalibration is performed for each region of the 3-D (or N-dimensional) array. Calibration coefficients are stored in, e.g., a 3-D (or any N-dimensional) matrix. The separation-MS dataset is subsequently loaded and all measured m/z values are corrected according to the 3-D calibration table as follows. A triple index (i, j, k) is attributed to each experimentally observed peak according to its TIC, m/z (or separation time), and individual abundance value. Then, the refined calibration for a corresponding (i, j, k) region is applied to calculate the accurate m/z. Lastly mass measurement accuracy is characterized after recalibration using a mass accuracy histogram. Since a statistical analysis is performed for each group, the total number of groups [e.g., $(N_{3D})=(N_{TIC})\times(N_2)\times(N_{Ai})$] should be small enough such that each group has a statistically large number of potential calibrants (e.g., greater than about 100 per D_HM interval). Optimal values for $(N_{TIC})$, $(N_2)$, and $(N_{Ai})$ can be adjusted for a particular system. Datasets with larger numbers of detected species and putative mass tags can be processed using a larger number of groups.

In the course of an automated analysis, LC-MS data are read from a file containing all detected isotopic structures, a raw mass accuracy histogram is generated, then a multi-regional recalibration is performed and a final mass accuracy histogram is calculated. Since computation time is reasonably small (from about 2 minutes for small datasets to about 20 minutes for more complex datasets), various combinations of parameters $(N_{TIC})$, $(N_2)$, and $(N_{Ai})$ can be used and/or tested. In, described previously, mass measurement precision $(dM_w)$ of the instrument calibration, 2.7 ppm, is improved to 1.9 ppm using a single group (region) general recalibration (see FIG. 9*a*) and to 1.0 ppm (see FIG. 9*b*) using a 64 group (region) multi-dimensional recalibration, the latter histogram maximum being increased by greater than 2-fold, yielding a significant reduction (about 2-fold) in the number of resulting random (i.e. false) identifications. The number of regions can be further increased with high confidence for more complex systems or when more species are assigned. No limitations are intended.

Samples of a *Neurospora Crassa* fungus proteome described, e.g., by Schmitt et al. (Proteomics. 2005 6(1), p. 72-80) were also analyzed using an 11 Tesla LC-FTICR-MS instrument. TABLE 2 tabulates data obtained for peptides in the samples before and after recalibration.

TABLE 2

*Neurospora crassa* peptides observed in a sample mass spectrum.

| Peak | m/z, theoretical | NET[1] | Z | Abundance | m/z, raw | m/z, corrected | Error, raw (ppm) | Error, corrected (ppm) | Peptide[5] (SEQ ID NO.) |
|---|---|---|---|---|---|---|---|---|---|
| 1 | 732.380091 | .3660 | 2+ | 7.15 | 732.383626 | 732.379924 | 4.834 | −0.229[2] | DFYHLAAGTI EVK; (1) |
| 1 | 732.383028 | .5200 | 2+ | 7.15 | 732.383626 | 732.379924 | 0.818 | −4.244[3] | SSIISNLTSE SVVAG; (2) |
| 2 | 734.891355 | .3471 | 2+ | 0.324 | 734.895726 | 734.891328 | 5.957 | −0.036[4] | SNAEANVVP LLEGR; (3) |
| 3 | 754.883195 | .3804 | 2+ | 1.4 | 754.886826 | 754.883027 | 4.817 | −0.223[2] | EGVTLGVGA SFDTQK; (4) |
| 3 | 754.885315 | .2818 | 2+ | 1.4 | 754.886826 | 754.883027 | 2.005 | −3.035[3] | PMMVSMTIT GITAR; (5) |
| 4 | 771.379431 | .3671 | 2+ | 0.567 | 771.383826 | 771.379794 | 5.706 | 0.471[4] | YSSEIAQAM VEVSK; (6) |
| 5 | 798.402906 | .3489 | 2+ | 0.563 | 798.407076 | 798.403006 | 5.23 | 0.126[4] | SIELDPAMT QSYIK; (7) |
| 6 | 842.085736 | .3684 | 3+ | 11.10 | 842.089643 | 842.085854 | 4.645 | 0.140[2] | AALYGTNQIF AQGNLDNEG ALSTR; (8) |
| 7 | 874.949932 | .3512 | 2+ | 0.714 | 874.954276 | 874.949569 | 4.971 | −0.415[2] | NIFGGAETLS VNAAAGTR; (9) |
| 8 | 892.738008 | .3985 | 3+ | 6.960 | 892.741810 | 892.737895 | 4.264 | −.126[2] | SIGGGQDMA QFEHEHLGD DFSASLK; (10) |
| 9 | 897.914944 | .6311 | 2+ | 0.491 | 897.916126 | 897.911351 | 1.319 | −4.005[3] | KKNANNNNN GGGIGGH ND; (11) |
| 10 | 903.947055 | .3672 | 2+ | 0.224 | 903.952326 | 903.947429 | 5.838 | 0.414[4] | EELQAAEAE ATFTIQR; (12) |
| 11 | 1046.006787 | .3535 | 2+ | 0.084 | 1046.01252 | 1046.006627 | 5.493 | −.153[4] | DAFAVVNGG VPETNALME EK; (13) |
| 12 | 1262.624966 | .3684 | 2+ | 5.13 | 1262.62897 | 1262.624147 | 3.179 | −0.650[2] | AALYGTNQIF AQGNLDNEG ALSTR; (8) |
| 13 | 1338.603373 | .3985 | 2+ | 0.251 | 1338.60927 | 1338.603542 | 4.413 | .126[2] | SIGGGQDMA QFEHEHLGD DFSASLK; (10) |

[1]Normalized elution time listed in the set of PMT tags; experimental NET = 0.3561

[2]Identified using 5 ppm tolerance for raw data; 1 ppm tolerance after recalibration; independently confirmed using 0.05 NET tolerance.

[3]Identified with 5 ppm tolerance using raw data; rejected as false positive using 1 ppm tolerance after recalibration; rejection is independently confirmed using 0.05 NET tolerance.

[4]Rejected using 5 ppm tolerance for raw data; identified as a match with 1 ppm tolerance after recalibration; independently confirmed as a true match using 0.05 NET tolerance.

[5]Different theoretical m/z values listed in column 2 for identical peptides in column 10 are due to different charge states, i.e., 2+ vs. 3+.

Figure 10:
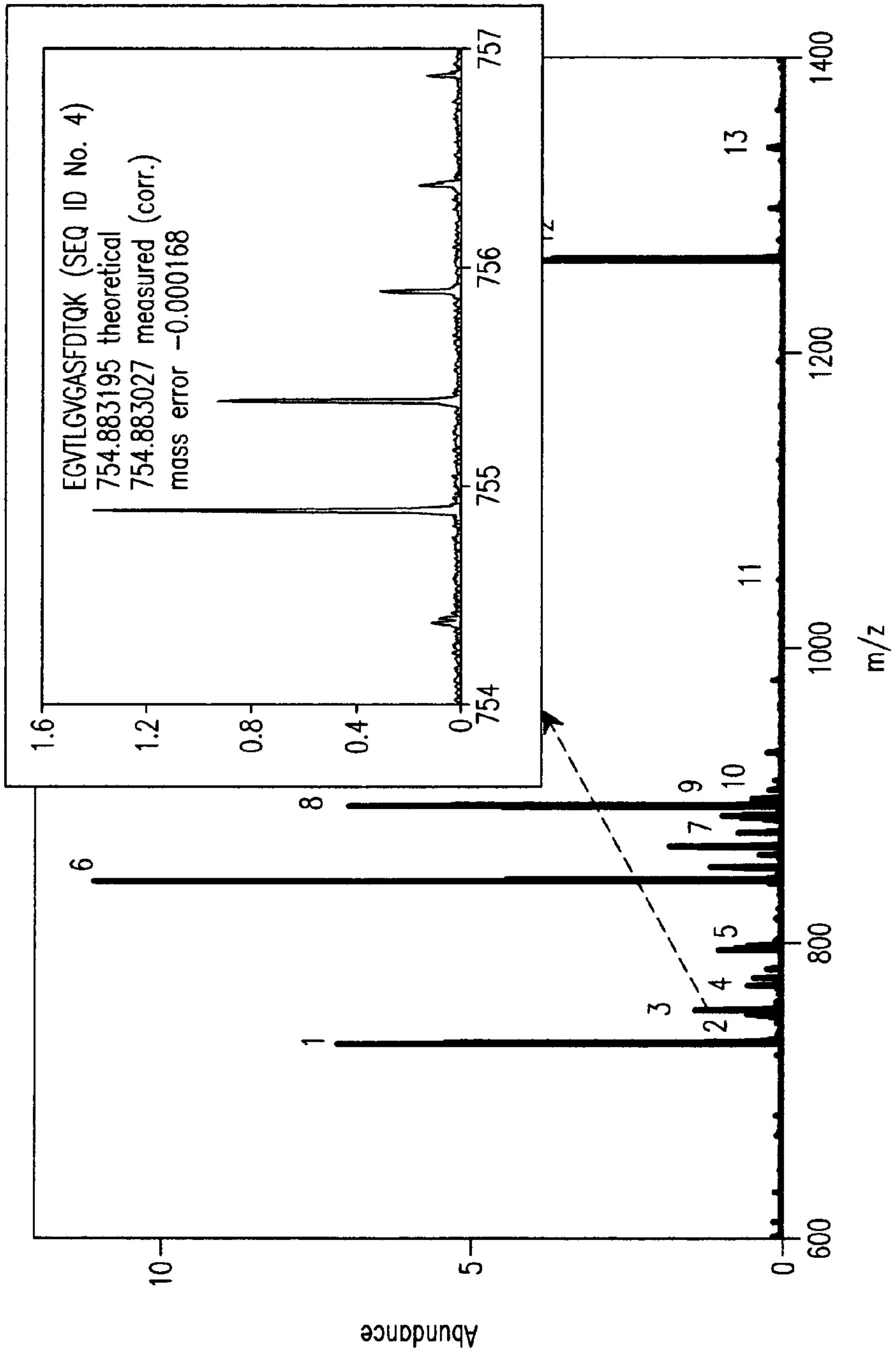
FIG. 10 is a sample mass spectrum resulting from LC-FTICR analysis of a *Neurospora crassa* fungal sample. Numbers designate isotopic structures matching to a putative mass list of peptides for *Neurospora crassa*. A sequence listing corresponding to peptide EGVTLGVGASFDTQK (SEQ ID NO.: 4) identified in the spectrum is listed for peak 2.

Peak numbers (1-13) in TABLE 2 designate isotopic structures matching to a putative mass list of peptides for *Neurospora crassa* obtained from a PMT database for this organism. Data in the database are generated experimentally, e.g., using fractionation in combined MS/MS measurements. FIG. 10 presents a mass spectrum from the LC-FTICR-MS analysis of the *Neurospora crassa* fungal sample. The 13 marked isotopic structures in FIG. 10 produce 15 possible matches listed in TABLE 2. A subset of all detected isotopic structures and possible matches is shown for simplicity. Mass measurement errors listed in TABLE 2 provide for proper identification of peptides in the analyzed samples. In the figure, the inset spectrum shows a high resolution detail view of a typical peak, e.g., peak number 3, corresponding to peptide EGVTLGVGASFDTQK (SEQ ID NO. 4), along with its associated isotopic structures. A 5 ppm tolerance was used for raw m/z values, typical for un-corrected FTICR data, and a tolerance of 1 ppm was used for data after recalibration, but tolerances are not limited thereto.

Figure 11:
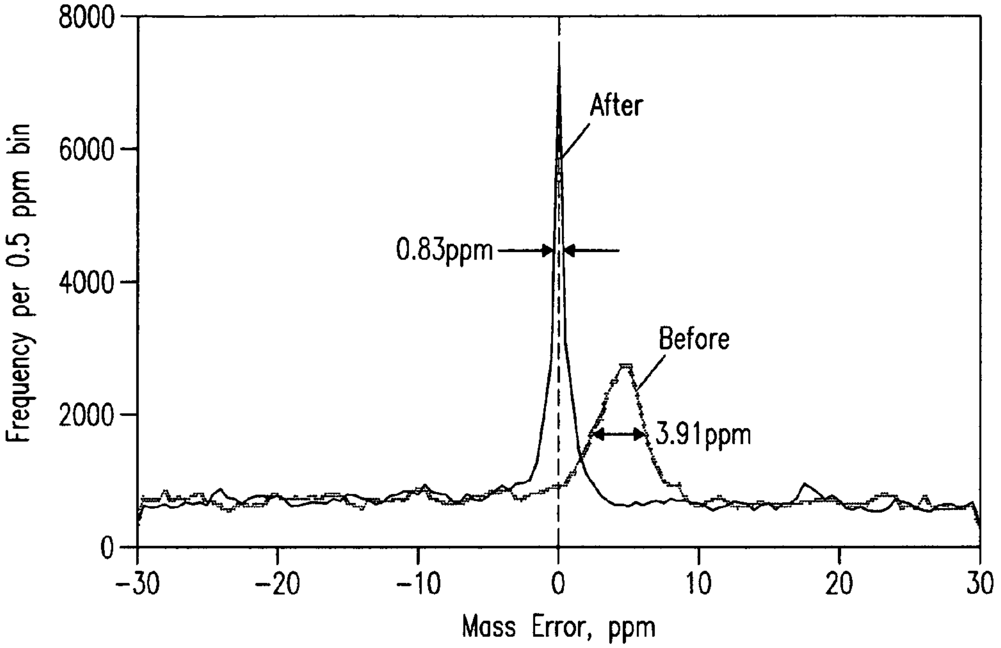
FIG. 11 is a mass accuracy histogram obtained from analysis of a *Neurospora Crassa* fungal proteome showing results before and following recalibration using a multi-dimensional (2D) recalibration method, according to yet another embodiment of the invention.

FIG. 11 presents mass accuracy histograms before and after recalibration of the MS data obtained from analysis of the *Neurospora Crassa* samples. Recalibration of data was effected using multi-dimensional recalibration. Number of calibration regions for (TIC), (m/z), and (peak intensity) was increased to 200 (10×2×10=200), but is not limited. Results show systematic mass measurement error ($dM_s$) (i.e. histogram maximum position) is corrected from about 5 ppm to about "0" ppm and the mass error spread ($dM_w$) is dramatically improved from about 3.9 ppm to about 0.8 ppm. The histogram maximum is increased by greater than about 3 times, with a corresponding improvement in the certainty of identifications. Mass measurement errors listed in TABLE 2 for all 13 peaks range are from about 0.8 ppm to about 6 ppm before recalibration and less than about 0.5 ppm after recalibration.

As a result of recalibration, 8 out of 15 tentative identifications listed in TABLE 2 from initial assignments before recalibration are corrected. Corrections include, but are not limited to, e.g., identifying false positives (e.g., three showing much worse MMA after recalibration), and identifying true matches (five showing improved MMA after recalibration) that would have been missed absent recalibration even with a wider tolerance. Mass accuracy improvement does not show a trend (e.g., is insensitive to) with ion abundance in the dynamic range greater than about 100 for this particular mass spectrum as a result of the abundance-specific correction.

An additional constraint can be applied for improved identification based upon the LC normalized elution time (NET). This parameter is not involved in the recalibration scheme and is used here as an independent criterion. Importantly, all 8 identifications changed as a result of recalibration were also found to be consistent with the elution time information, either passing (for true matches) or not passing (for false raw data matches) the LC NET tolerance 0.05. The wider NET tolerance of 0.05 accounts for the fact that the NET value corresponding to the sample spectrum disregards elution profiles of detected species (i.e. the location in the peak); NET tolerances based upon the LC elution peak maxima can be as small as 0.01.

Mass Correction/Recalibration will now be further described.

Mass Correction/Recalibration

In the mass correction/recalibration method, no initial instrument or instrument-specific calibration coefficients are required. In contrast to use of an instrument-specific calibration function, mass correction/recalibration uses a list of measured m/z values generated from an analysis. A small correction is applied to m/z values to minimize mass measurement errors, similar to a regular linear fit, where slope and intercept are adjusted to find a best fit to measured values. The approach is closely related to general recalibration described herein wherein the instrument calibration function is used. The FTICR calibration function in Equation [5] can be rewritten in the following linearized form, as shown in Equation [15]:

$$(m/z)^{-1}=[(f/A)+(B/A)]=[(f_L)+(B_L)] \qquad [15]$$

Here ($f_L$) is the peak frequency scaled to inverse m/z units. ($B_L$) is the scaled frequency shift, which has a value that is small compared to ($f_L$), where $|B_L|$ is less than about $[10^{-4}\cdot(f_L)]$. The initial instrument calibration ($A_0$, $B_0$) corresponds to a pair of values ($f_{L0}$), ($B_{L0}$) for each m/z. Aim is an improved calibration ($A_S$, $B_S$) for conditions of a particular separation-MS measurement. The search can be realized in a form of a linear transformation (LT) given, e.g., by equations [16] and [17]:

$$x_1=C_1\cdot x+C_0 \qquad [16]$$

$$x_1=(m/z_1)^{-1},\ x=(m/z)^{-1} \qquad [17]$$

The transformation scales all inverse m/z values (x) by a scaling factor ($C_1$) that differs from 1 by a small fraction ~1 ppm. Additionally, all values are incremented by a small shift ($C_0$). The LT coefficients ($C_0$, $C_1$) deliver minimization of the mass measurement error for the new set of corrected values $m/z_1$. The error minimization algorithm is based on the mass accuracy histogram, as described above. A range of LT coefficients is searched for using expressions [18] and [19]:

$$dC_0=C_0\cdot D_{ppm} \qquad [18]$$

$$dC_1=f_L\cdot D_{ppm} \qquad [19]$$

Search for an optimal pair ($C_0$, $C_1$) covers a rectangular region centered at $C_0$=0, $C_1$=1 and extends to a range set by ($T_{search}$). Iterations with subsequent reduction of ($D_{ppm}$) can be used to speed the search, e.g., as described previously for the search of ($A_s$, $B_s$). Once a pair of LT coefficients ($A_s$, $B_s$) is found, calibration coefficients ($C_0$, $C_1$) are derived using equation [20] and [21]:

$$A_s=A_0/C_1 \qquad [20]$$

$$B_s=B_0+A_0(C_0/C_1) \qquad [21]$$

Adjustment of LT coefficients is equivalent to adjustment of calibration coefficients, but does not require information on initial instrument calibration.

The above procedure uses the list of m/z values from the analysis, and the LT equation (equation [16]) is applied to inverse m/z values. However, similar results are obtained if the LT is applied to the m/z values themselves for calibration corrections over a small variation range (<~100 ppm). In this case the definition of the transformed value (x) is as follows:

$$x=m/z \qquad [22]$$

The LT coefficients now acquire a simple meaning. Scaling factor ($C_1$) performs proportional scaling of all m/z values and term ($C_0$) produces a small mass shift. Each of the corrections gives a small ppm order of magnitude change. The mass accuracy histogram optimization procedure applied above for the search of optimal calibration coefficients can be used in a similar fashion to find a pair of optimal LT coefficients ($C_1$, $C_0$). Corrected values $m/z_1$ are expressed as follows:

$$m/z_1=C_1 m/z+C_0 \qquad [23]$$

This linear transformation of a list of m/z values constitutes a general recalibration function. Formally it has little relation to the instrument calibration function of Equation [5] and can be applied to a variety of MS instruments. The LT terms ($C_1$, $C_0$) should give a small relative variation (δ), as denoted by equations in [24]:

$$C_1=1+\delta_1;\ C_0=\delta_2\cdot m/z_{low}\ |\delta_{1,2}|<<0.001 \qquad [24]$$

Here ($m/z_{low}$) is the low m/z limit of a list of m/z values used for LT.

The general recalibration approach has been tested using various datasets and the same level of mass accuracy improvement has been obtained as compared to direct recalibration. An advantage of the general recalibration is that it can be applied to instruments that do not explicitly provide the calibration information or access to raw data.

FIG. 12 is a mass accuracy histogram obtained from analysis of a QC peptide mixture in a combined LC-LTQFT-MS instrument in conjunction with a general recalibration method (i.e., no initial calibration coefficients are used), according to another embodiment of the invention. The instrument uses automatic gain control (AGC) to normalize ion population in the FTICR cell in order to obtain more accurate mass measurements. In tests conducted herewith, the AGC target was set to $0.5\times10^6$ ions, where mass measurement accuracies are only moderately affected due to space charge. The histogram uses a reduced bin size of 0.2 ppm. In the instant case, optimal multi-region division uses 4 regions for TIC, 16 regions for the spectrum acquisition time, and 8 regions for the peak intensity, i.e. a total of 512 regions, but is not limited thereto. Recalibration produces a symmetric distribution with the FWHM mass error spread improved from 1.21 to 0.66 ppm, with the histogram maximum corrected from −0.6 ppm to 0 ppm. The wing of positive mass errors is efficiently compensated by recalibration owing to the 16 regions of separation time applied.

The mass-correction equation can be considered a power series expansion of a small m/z correction increment, denoted in equation [25]:

$$\Delta m/z=[(m/z_1)-(m/z)]=[(\delta_1 m/z)+(C_0)] \qquad [25]$$

Generally, the more power series terms that are used, the more accurate the approximation, as long as sufficient data (confidently assigned species) exists to avoid over-fitting. In the general case of a power series of order (N) the following mass-correction equation [26] is obtained:

$$\Delta m/z=[C_0+\delta_1 m/z+C_2(m/z)^2+\ldots+C_N(m/z)^N] \qquad [26]$$

Results presented thus far were obtained using the same set of putative compounds both for recalibration and for the mass accuracy evaluation. This creates favorable conditions for mass measurement accuracy improvement, since the set of m/z values used for the mass accuracy test are the same as used for the recalibration.

Figure 13A:
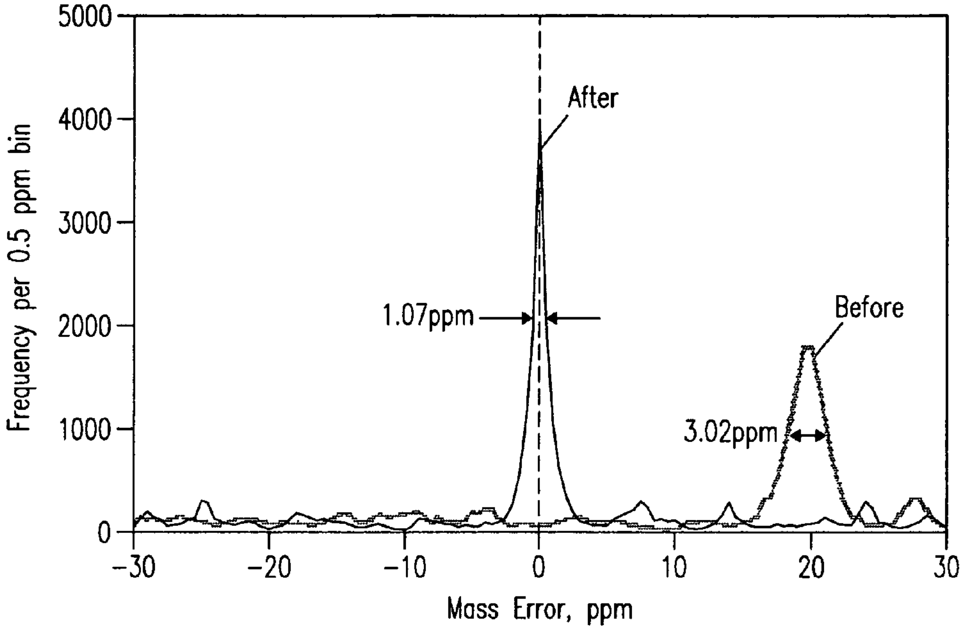
FIGS. 13*a*-13*b* present mass accuracy histograms obtained before and after recalibration using a multidimensional recalibration method, according to yet another embodiment of the invention. In (a), results before and after recalibration are shown using a first half of a putative compound list. In (b) results before and after recalibration are shown using a second half of a putative compound list, according to yet another embodiment of the invention.
Figure 13B:
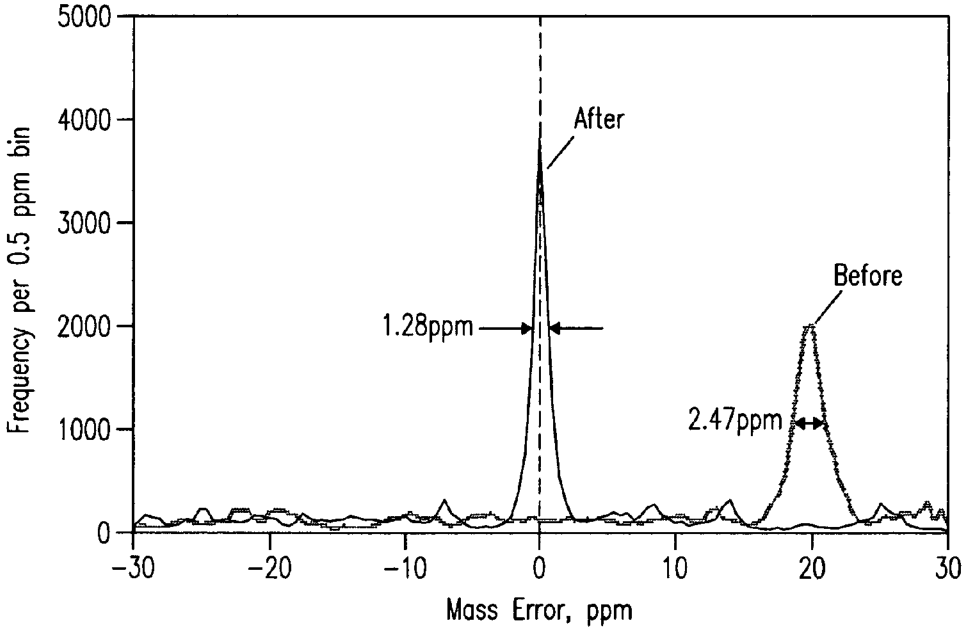

This recalibration method has also been demonstrated for situations in which two independent lists of peaks are used separately for recalibration and for mass accuracy characterization, respectively, e.g., when a mixture of two proteomes is analyzed and only a single list of putative compounds is available, or when a proteome sample has otherwise been spiked with known peptides. One set of compounds is treated as an unknown in order to evaluate mass accuracy improvement obtained using a first set of compounds. Tests were carried out using multidimensional recalibration using two input datasets, i.e. two putative compound lists, one for recalibration and the other for mass accuracy control. Datasets were compared and all common compounds were removed. FIGS. 13*a*-13*b* present mass accuracy histograms before and after multidimensional recalibration, obtained from analysis of a QC peptide sample mixture (comprised of 23 peptides and 12 proteins digested with trypsin) using an 11 Tesla LC-FTICR instrument, according to yet another embodiment of the invention. In the instant embodiment, a putative list of compounds is split into two lists, each list containing 2103 entries, but is not limited. A first list is used for recalibration; a second list is used as a mass accuracy control. In FIG. 13*a*, a first half of the putative compound list is used for multidimensional recalibration ($N_{TIC}$=4; $N_{m/z}$=2; $N_{Ai}$=4) for evaluation of the mass accuracy results. In the figure, systematic error is fully compensated; mass accuracy improves from dMs=20 to dMs=0; mass spread (dMw) improves from 3.0 ppm to 1.0 ppm, similar to that observed previously (FIG. 9*b*) when an entire list of potential mass tags was employed. In FIG. 13*b*, results are shown using a second half of the putative compound list, but in the instant case are not used for recalibration. Here, once a new calibration is obtained, it can be applied to all detected m/z values. The second half of the putative list is then used to determine, and thus control, how accurate measured m/z values are following recalibration. This is an additional test more stringent than when the same exact list is used both for recalibration and for mass accuracy control. The test proves that the mass accuracy improvement is real and that the accuracy improvement is extended to all detected ions whether involved or not involved in the process of recalibration.

As illustrated in FIG. 13*b*, mass measurement improvement observed in the first dataset is transferred to the control dataset, systematic error is fully compensated, (i.e., $dM_s$=0), and the mass error spread ($dM_w$) is reduced from about 2.5 ppm to about 1.3 ppm. Values are slightly greater (worse) than those observed in the recalibration dataset. The slight difference in performance in the instant case is attributed to the 2-fold reduction in number of regions and the smaller accurate mass number used as compared to the full dataset. In the instant embodiment, recalibration (FIG. 13*a*) works as an internal calibration, improving mass accuracy of peaks not even involved in the procedure (FIG. 13*b*). In particular, mass accuracy improvement for mass peaks and mass tags used for recalibration (i.e., following recalibration) is transferred to mass peaks and mass tags not used in the recalibration, an important tool and finding.

Mass-Correction/Recalibration described herein is applicable to other separation-MS instrument configurations and types. For example, Time of Flight (TOF) MS instruments are also capable of accurate mass measurements. As with FTICR MS instruments, however, it can be challenging to achieve high mass measurement accuracy of less than about 10 ppm, for example, particularly in conjunction with on-line (e.g. LC) separations. In such situations, multi-region recalibration can be applied to, e.g., LC-TOF-MS data providing significant mass accuracy improvements. Mass-Correction/Recalibration can also be used appropriately. For example, a commonly used TOF calibration function is as follows [22]:

$$m/z=C_{TOF}(t_i-t_0)^2 \qquad [22]$$

Here ($C_{TOF}$) is the proportionality coefficient defined by the effective length of the flight path; ion energy ($t_i$) is the measured time of flight; and ($t_0$) is the correction term taking into account an uncertainty in the reference point corresponding to time 0. Equation [22] can be linearized versus calibration terms for the square root of m/z as follows from equations in [23]:

$$(m/z)^{1/2}=C_L t_i - C_L t_0;\ C_L=(C_{TOF})^{1/2} \quad [23]$$

Recalibration can be obtained by means of a linear transformation (LT) applied to $(m/z)^{1/2}$ by using equations in [23]. Since small variations are applied, nearly identical results are obtained if m/z values are directly used for LT. A small relative variation of a value (x) converts to ~½ of the variation of ($x^{1/2}$), which can be accounted for by a corresponding adjustment of the variation increment ($D_{ppm}$). The multidimensional recalibration method based on the LT equation described herein has also been applied to proteomics data obtained using a commercial Micromass qTOF mass spectrometer instrument. The instrument was coupled to LC and the LC-MS performance was characterized using a QC peptide mixture.

FIG. 14 presents mass accuracy histograms obtained from analysis of a QC peptide mixture in a combined LC-TOF-MS experiment using an Agilent TOF-MS, according to another embodiment of the invention. Optimal settings for the multidimensional recalibration used 2 regions for TIC (i.e., $N_{TIC}$=2), 32 regions for elution time (i.e., $N_{NET}$=32), and 8 regions for individual peak intensity (i.e., $N_{Ai}$=8), for a total number of 3-D regions of 512 (i.e., 2×32×8=512). Division of the elution time into 32 regions indicates temporal variations in the mass calibration, possibly due to temperature drifts and power supply instabilities. Before recalibration, a mass error distribution offset (mass accuracy) of +20 ppm, with a mass error (FWHM) spread ($dM_w$) of 45 ppm, is observed. The non-Gaussian shape of the distribution indicates that systematic (i.e. non-random) factors contribute to the mass measurement errors. An increased tolerance (e.g., $T_{ppm}$=100 ppm) for putative calibrants ensures that all useful calibrants are included. Multi-region recalibration corrects systematic error ($dM_s$) in the mass accuracy histogram to "0" ppm and the mass error spread ($dM_w$) to 6.8 ppm (FWHM). In the figure, the base line width of the true attribution peak corresponds to ~15 ppm tolerance, similar to that obtained previously for LC-TOF-MS data using a mass correction/recalibration approach employing a more laborious direct assignment of the calibrants.

CONCLUSION

Recalibration methods described herein provide tools useful for analysis of separation-MS data, and other similar types of data, e.g. data from proteomics measurements, providing improved mass measurement accuracy and precision. In addition, results demonstrate an increased level of confidence for identifications and/or increased numbers of true attributions or assignments. While the present disclosure is exemplified by specific embodiments, it should be understood that the invention is not limited thereto, and variations in form and detail may be made without departing from the spirit and scope of the invention. All such modifications as will be envisioned by those of skill in the art are within the scope of the invention.

We claim:

1. A method for optimizing accuracy and precision of measured mass-to-charge ratio (m/z) values obtained in a combined separation—mass spectrometry measurement, characterized by the step of:

calculating corrected m/z values using a preselected instrument-specific calibration function containing at least one measured quantity and at least one optimized calibration coefficient value, said optimized calibration coefficient is determined by selectively adjusting values of calibration coefficients of said preselected instrument-specific calibration function until a preselected peak of a mass accuracy histogram is positioned at a mass residual value of zero and a minimized peak width is obtained.

2. The method of claim 1, wherein said at least one measured quantity of said preselected instrument-specific calibration function is selected from the group consisting of characteristic ion frequency, total ion current, ion abundance, ion count, mass-to-charge ratio, acquisition time, time of flight, and combinations thereof.

3. The method of claim 1, wherein said instrument-specific calibration function is a calibration function of a mass spectrometer instrument selected from the group consisting of Fourier Transform instruments, time-of-flight instruments, ion cyclotron resonance instruments, orbitrap instruments, and combinations thereof.

4. The method of claim 1, wherein said mass accuracy histogram displays numbers of matches between measured and exact m/z value pairs that fall within a preselected mass residual tolerance threshold that defines potentially correlated pairs of m/z values.

5. The method of claim 1, wherein said preselected histogram peak includes a predetermined fraction of all potentially useful matches of m/z value pairs that fall within said preselected mass residual tolerance threshold.

6. The method of claim 5, wherein said predetermined fraction of all potentially useful matches of m/z value pairs is a fraction greater than or equal to about 99%.

7. The method of claim 1, wherein said preselected histogram peak is derived from a table of mass residual values calculated for each of said matching m/z value pairs expressed either in absolute or in relative units for preselected m/z value bins.

8. The method of claim 1, wherein said optimized calibration coefficient is determined by adjusting at least one calibration coefficient in said preselected instrument-specific calibration function iteratively using an increment value up to about 10 ppm.

9. The method of claim 8, wherein said increment value for a subsequent iteration is smaller than that of a preceding iteration.

10. The method of claim 1, wherein the step of calculating said corrected m/z values includes calculating m/z values at all peak frequencies measured in said separation mass spectrometry measurement.

11. A multiregional method for optimizing accuracy and precision of measured mass values obtained in a combined separation—mass spectrometry measurement, characterized by the steps of:

partitioning measured mass values into a preselected number of groups according to preselected regions of a physical parameter that influences accurate mass calibration; and recalculating measured m/z calculating corrected mass values within each preselected region using a preselected instrument-specific calibration function containing at least one measured quantity and at least one optimized calibration coefficient value, said optimized calibration coefficient determined by selectively adjusting calibration coefficient values of said preselected instrument-specific calibration function until a preselected peak of a mass accuracy histogram is positioned at a mass residual value of zero and a minimum peak width is obtained for each of said preselected groups of measured m/z values.

12. The method of claim 11, wherein said physical parameter is selected from the group consisting of characteristic frequency, total ion current, total ion count, total ion intensity, ion intensity, individual ion intensity, ion abundance, m/z, m/z range, time, elution time, time of flight, and combinations thereof.

13. The method of claim 11, wherein said preselected groups of measured m/z values comprise a substantially equal quantity or population of m/z values corresponding to each preselected region of said physical parameter.

14. The method of claim 11, wherein said measured mass values and said corrected mass values are molecular mass values.

15. The method of claim 11, wherein said measured mass values and said corrected mass values in each of said preselected groups are monoisotopic m/z values.

16. A multidimensional method for optimizing accuracy and precision of measured mass values obtained in a combined separation—mass spectrometry measurement, characterized by the steps of:

partitioning measured mass values into a preselected number of groups according to preselected multidimensional regions of at least one physical parameter that influences accurate mass calibration; and calculating corrected mass values within each of said multidimensional preselected regions by selectively adjusting at least one calibration coefficient value until a preselected peak of a mass accuracy histogram generated separately for each multidimensional region is positioned at a mass residual value of zero and a minimum peak width is obtained.

17. The method of claim 16, wherein the step of calculating said corrected mass values includes use of a number (N) of physical parameters that define an N-dimensional data array defined by preselected regions of each of said (N) physical parameters.

18. The method of claim 17, wherein said physical parameters are selected from the group consisting of: characteristic frequency, total ion current, total ion count, total ion intensity, ion intensity, individual ion intensity, ion abundance, m/z, m/z range, time, elution time, time of flight, and combinations thereof.

19. The method of 17, wherein said N-dimensional data array is a 2-dimensional data array defined by two measured physical parameters.

20. The method of claim 16, wherein said measured m/z mass values and said corrected mass values are molecular m/z mass values.

21. The method of 16, wherein said measured mass values and said corrected mass values are monoisotopic m/z values.

22. The method of claim 16, wherein said mass accuracy histogram for each multidimensional region represents numbers of matches between said corrected mass values in each region and exact mass values that fall within preselected bins of said mass residual values.

23. The method of claim 22, wherein said preselected bins have a size Lip to about 10 ppm.

24. The method of claim 22, wherein said mass accuracy histogram for each multidimensional region displays numbers of matches between measured and exact mass value pairs that fall within a preselected mass residual tolerance threshold that defines potentially correlated mass value pairs.

25. The method of claim 24, wherein said tolerance value threshold is selected in the range from about 5 ppm to about 100 ppm.

26. The method of claim 16, wherein determining said at least one optimized calibration coefficient value includes selectively adjusting at least one initial calibration value obtained from an external calibration of a mass spectrometer.

27. The method of claim 16, wherein determining said at least one optimized calibration coefficient includes use of a calibration function that is applicable to a preselected mass spectrometer instrument.

28. The method of claim 27, wherein determining said at least one optimized calibration coefficient includes simultaneous adjustment of all calibration coefficient values of said calibration function.

29. The method of claim 16, wherein calculating of said corrected mass values in each of said preselected groups of measured mass values includes use of a mass-correction function of the following form: $(m/z_c)=F_c(m/z, C_1, \ldots, C_M)$, where $(m/z_c)$ are corrected mass values, (m/z) are measured mass values, and $(F_c)$ is a correction function defined by up to (M) optimized calibration coefficients.

30. The method of claim 29, wherein said (M) optimized calibration coefficients are optimized for each of said multidimensional regions of measured m/z values defining said (N) dimensions of preselected physical parameters.

31. The method of claim 30, wherein said preselected physical parameters are selected from the group consisting of: characteristic frequency, total ion intensity, individual ion intensity, separation parameters, separation time, m/z range, time of flight, and combinations thereof.

32. The method of claim 16, wherein said preselected peak of said mass accuracy histogram is optimized for each of said multidimensional regions to determine said (M) optimized calibration coefficients.

33. A method of histogram maximization for determining optimized calibration coefficients for recalibrating separations-mass spectrometry data, comprising the steps of:

generating one or more sets of (M) trial calibration coefficients;

generating a histogram comprising a distribution of matches between measured mass values and putative masses as a function of mass deviation for each of said one or more sets of M calibration coefficients;

determining a central zero mass deviation histogram value for each of said one or more sets of M trial calibration coefficients;

wherein values for calibration coefficients that produce a central histogram value maximum determine coefficient values optimized for said recalibrating of separations-mass spectrometry data.

34. The method of claim 33, wherein said calibration coefficients are generated in conjunction with an instrument-specific calibration function.

35. The method of claim 34, wherein said instrument-specific calibration function is exchanged with a mass-correction function.

* * * * *